United States Patent
Chung et al.

(10) Patent No.: US 11,705,078 B1
(45) Date of Patent: Jul. 18, 2023

(54) SYSTEMS AND METHODS FOR SELECTIVE DISABLEMENT OF BACKLIGHTS CORRESPONDING TO IDENTIFIED NON-UTILIZED VIEWABLE AREAS OF A DISPLAY PANEL

(71) Applicant: DELL PRODUCTS L.P., Round Rock, TX (US)

(72) Inventors: Tze Fung Chung, Singapore (SG); Dengzhai Xiong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/681,257

(22) Filed: Feb. 25, 2022

(51) Int. Cl.
*G09G 3/34* (2006.01)
*G02F 1/13357* (2006.01)

(52) U.S. Cl.
CPC ..... *G09G 3/3426* (2013.01); *G02F 1/133603* (2013.01); *G02F 1/133615* (2013.01); *G09G 2320/0646* (2013.01); *G09G 2320/0686* (2013.01); *G09G 2330/021* (2013.01)

(58) Field of Classification Search
CPC ......... G09G 3/3426; G09G 2320/0646; G09G 2320/0686; G09G 2330/021; G02F 1/133603
See application file for complete search history.

(56) References Cited

U.S. PATENT DOCUMENTS

| | | | |
|---|---|---|---|
| 9,372,521 B2 | 6/2016 | Sultenfuss et al. | |
| 9,558,527 B2 | 1/2017 | Sierra et al. | |
| 10,997,687 B1 | 5/2021 | Guerra et al. | |
| 11,428,966 B2 | 8/2022 | Chang | |
| 2013/0002524 A1* | 1/2013 | Sirpal | G06F 1/1616 345/1.3 |
| 2018/0011675 A1* | 1/2018 | Athreya | G06F 3/1454 |
| 2021/0333084 A1 | 10/2021 | Ho et al. | |
| 2021/0405404 A1 | 12/2021 | Chang | |

OTHER PUBLICATIONS

Olchovik, "Systems and Methods for Increasing Backlight Uniformity for Backlit Display Panels", U.S. Appl. No. 17/501,794, filed Oct. 14, 2021, DELL:327, 50 pgs.
Wikipedia, "Backlight", Obtained From Internet Jan. 25, 2022, 8 pgs.
(Continued)

*Primary Examiner* — Kenneth B Lee, Jr.
(74) *Attorney, Agent, or Firm* — Egan, Enders & Huston LLP

(57) ABSTRACT

Systems and methods are provided that may be implemented to identify viewable areas of a display panel (such as a liquid crystal display (LCD) panel) of a display panel assembly that are currently not utilized by a user, and then to selectively and dynamically turn off backlights or blocks of backlights (e.g., such as light emitting diode "LED" backlight elements) that illuminate viewable areas of the display panel that correspond to these non-utilized viewable areas. The systems and methods may be so implemented in one example to reduce power consumption of a display panel assembly.

20 Claims, 12 Drawing Sheets

(56) References Cited

OTHER PUBLICATIONS

Display Port, "VESA Publishes DisplayPort 2.0 Video Standard Enabling Support for Beyond-8K Resolutions, Higher Refresh Rates for 4K/HDR and Virtual Reality Applications-VESA-Interface Standards for the Display Industry", Obtained From Internet Jan. 27, 2022, 5 pgs.
Cnet, "LED Local Dimming Explained", Mar. 26, 2017, 11 pgs.
Wikipedia, "LED-Backlit LCD", Obtained from Internet Jan. 25, 2022, 7 pgs.
Schultz, "The Benefits of Using Windows 10 on a 34-Inch Ultrawide Monitor", Jan. 2017, 17 pgs.
Dell, "What is Dell Display Manager", Jan. 19, 2022, 15 pgs.

\* cited by examiner

SYSTEMS AND METHODS FOR SELECTIVE DISABLEMENT OF BACKLIGHTS CORRESPONDING TO IDENTIFIED NON-UTILIZED VIEWABLE AREAS OF A DISPLAY PANEL

FIELD

This application relates to information handling systems and, more particularly, to controlling backlights for display panels of information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In response to consumer needs, manufacturers are introducing liquid crystal display (LCD) monitors having larger and larger screen sizes for information handling systems. Current examples of such larger LCD monitors include 40-inch and 49-inch sized LCD monitors. These larger size LCD panel monitors consume more energy than smaller LCD monitors, with the major source of the LCD monitor power consumption being used to power backlights to illuminate viewable images on the LCD monitor Operating systems, such as Microsoft Windows operating systems, allow an information handling system user to re-size and/or simultaneously display multiple application windows on one or more LCD monitors that are coupled to the information handling system. In many usage scenarios, a user does not fully utilize the entire viewable screen area of a LCD display monitor, such as when the currently displayed application windows do not fully occupy the entire viewable area of the LCD monitor. In such scenarios, these non-utilized areas remain lighted or illuminated by backlights of the LCD monitor. This is especially true for an external LCD monitor or a secondary LCD monitor coupled to the information handling system.

It is known to reduce power consumption of a LCD monitor by turning off all components of the entire LCD monitor or placing the entire LCD monitor into a power save mode. In either case, all backlights of the LCD monitor are turned off to reduce power consumption. Other techniques to reduce LCD monitor power consumption include employing more efficient light emitting diodes (LEDs) in the backlight unit of a LCD monitor, using display panel material that has better light transmittance, and configuring a LCD monitor such that more backlight is focused at a center region of the LCD monitor than is provided to areas surrounding the center region of the LCD monitor.

The Video Electronics Standards Association (VESA) DisplayPort™ 2.0 Video Standard (DP 2.0) incorporates a Panel Replay capability that enables a host video processor or graphics processing unit (GPU) coupled to a LCD monitor that supports this DP 2.0 feature to only update an image displayed on the LCD monitor if it has changed since the last video frame update. When so implemented, the host video processor of GPU will stop sending new video frames as long as there is no change to the previous video frame so that the LCD monitor will replay the same image.

LCD monitors may employ microprocessors that in include a scalar microprocessor and a timing controller (Tcon) that receive and process image data from a host processor and provide resulting backlight control and image data for display by the LCD monitor. The scalar may scale image data up or down, perform color enhancement to image data, and execute a local dimming algorithm.

SUMMARY

Disclosed herein are systems and methods that may be implemented to identify viewable areas of a display panel (such as a liquid crystal display (LCD) panel) of a display panel assembly that are currently not utilized by a user, and then to selectively and dynamically turn off (or disable) backlights or blocks of backlights (e.g., such as light emitting diode "LED" backlight elements) that illuminate viewable areas of the display panel that correspond to these non-utilized viewable areas. The disclosed systems and methods may be so implemented in one embodiment to reduce power consumption of a display panel assembly. The disclosed systems and methods may be implemented with a variety of different types of display panels and display panel assemblies including, but not limited to, display panels for notebook computers, tablet computers, smart phones, televisions, desktop or tower computers (e.g., separate computer display monitors coupled to a desktop or tower computer), etc. The disclosed systems and methods may also be implemented in similar manner with organic light emitting diode (OLED) display panel assemblies, in which case individual OLEDs or blocks of OLEDs corresponding to identified non-utilized viewable areas of the OLED display panel may be turned off (instead of turning off individual backlights or blocks of backlights of a LCD display panel assembly).

Examples of non-utilized viewable areas of a display panel include, but are not limited to, one or more pre-designated partition area/s of the same partitioned display panel that do not currently have at least one application window "snapped" to it by an information handling system user, application window area/s of one or more current application windows that are designated to be dimmed on a display panel by an information handling system user, an entire viewable area of a display panel that has not changed (i.e., the displayed images on the display panel are merely being replayed and not updated with new video frames) by a host programmable integrated circuit or graphics processing unit (GPU) for a pre-designated threshold amount of time (indicating that the entire viewable area of the display panel is not currently being utilized by the current system user), and/or other types of viewable areas of a display panel (e.g., such as multiple picture-in-picture "PIP" or multiple picture-by-picture "PBP" areas of the same display panel)

that are each dedicated to display image content from a respective image source that is currently not active (i.e., that is not currently providing any image signal). When implemented with battery-powered portable or mobile information handling systems (e.g., such as notebook and tablet computers, smart phones, etc.), additional advantage of reduced battery consumption may be achieved.

In this way, the disclosed systems and methods may be implemented in one embodiment to reduce display panel power consumption by dynamically turning off only a selected subset of the display panel backlights that correspond to one or more portions (e.g., one or more sections) of a display panel, while the remaining backlights (i.e., that are not included in the selected subset) that correspond to other portion/s of the same display panel remain turned on to illuminate their respective display panel portion/s. In doing so, the disclosed systems and methods address usage scenarios in which a user does not fully utilize the entire display panel viewable screen area (e.g., including viewable screen areas of an external display or a secondary display) by turning off backlights corresponding to those viewable screen area/s of the same display panel so that they are not fully lit up or illuminated all the time. In this regard, a given backlight (or given block of backlights) may be selectively turned off by disabling or otherwise selectively controlling the given backlight or (or given block of backlights) so that it does not emit light to illuminate the corresponding viewable screen area/s of the display panel. Using one embodiment of the disclosed systems and methods, environmental requirements (e.g., such as Energy Star, CEC, etc.) may be met with a lower cost display panel design.

In one exemplary embodiment, a display management software tool may be executed on a host programmable integrated circuit of an information handling system to identify one or more non-utilized viewable area/s of a display panel that are not to be illuminated by display panel backlights by allowing a system user to use the display management software tool to selectively partition the entire viewable area of the display panel into designated utilized display panel area partitions/s that are illuminated by display panel backlights and other designated non-utilized display panel area partition/s that are not illuminated by display panel backlights. In this way, a system user may be allowed to utilize manual control methods to alter backlighting of display screen viewing areas of their choice.

In such an embodiment, the display management software tool may further execute to align the designated utilized and non-utilized partitions of the viewable area of the same display panel to different particular dimmable backlight zone/s (e.g., LED panel backlight blocks) of the display panel such that the display management software tool may communicate with a programmable integrated circuit (e.g., scalar) of the display panel (e.g., using specific defined RGB color coordinates to convey messages to the scalar) to cause the backlights corresponding to the utilized display panel area partition/s to remain turned on to illuminate displayed content placed by the user within the utilized display panel area partition/s and to cause the display panel backlights corresponding to the designated utilized display panel area partition/s to remain turned on to illuminate viewable content placed by the user within the utilized display panel area partition/s while at the same time causing the backlights corresponding to the designated non-utilized display panel area partition/s to remain turned off so that the viewable content placed by the user within the non-utilized display panel area partition/s is not illuminated by the corresponding display panel backlights.

In one exemplary embodiment, a system user may use manual control methods (e.g., via information handling system input/output device/s such as mouse, touchpad, and/or keyboard) to dynamically move or place application windows between one or more designated non-viewable display panel area/s on the same display panel that are not illuminated by backlights and one or more designated viewable display panel area/s that are designated as viewable and that are illuminated by display panel backlights. In such an embodiment, the current placement location of a given application window on the viewable area of the display panel identifies in real time whether the given application window is currently utilized (and illuminated by display panel backlights) or currently non-utilized (and not illuminated by display panel backlights). Thus, the system user may alter backlighting of viewable areas of their choice.

In another exemplary embodiment, a programmable integrated circuit (e.g., scalar) of a display panel may execute to identify one or more non-utilized viewable area/s of a display panel that are not to be illuminated by display panel backlights by monitoring inputs of multiple image sources that provide images (e.g., video and/or static images) for display on different viewable areas (e.g., PIP and/or PBP areas) of the same display panel. In such an embodiment, each of the different viewable areas (e.g., PIP and/or PBP areas) may be aligned by the scalar to different respective dimmable backlight zone/s (e.g., LED panel backlight blocks) of the display panel such that such that the programmable integrated circuit of the display panel may execute in real time to cause the backlights of the display panel corresponding to one or more utilized viewable area's of the display panel that are each currently receiving active image content input signals from an active image source to remain turned on to illuminate the actively displayed image content from the active image source's while at the same time causing the backlights of the same display panel corresponding to one or more non-utilized viewable area's of the same display panel that are each not currently receiving image content input signals from an active image source (e.g., such as when their respective image source/s are not active) to remain turned off so that the non-utilized viewing area's are not illuminated by backlights of the same display panel.

In another exemplary embodiment, a non-utilized viewable area of a display panel may be identified by monitoring the status of a viewable image displayed on the display panel by a host programmable integrated circuit or GPU that implements the Panel Replay capability of the VESA DisplayPort™ 2.0 Video Standard (DP 2.0). In such an embodiment, the viewable area of a display panel may be identified as non-utilized when it has not been updated with new video frames for a pre-designated threshold amount of time (i.e., the displayed images on the display panel are merely being replayed and not updated with new video frames). The display panel backlights (or blocks of backlights) may be dynamically turned off when it has only been replayed (and not updated with new video frames) for a duration of time that meets or exceeds the pre-designated threshold amount of time.

In one respect, disclosed herein is a method, including: providing image content data to a display panel assembly that includes a display panel, and displaying illuminated image content from the image content data on the display panel. The method may also include; executing programming on at least one programmable integrated circuit to: identify one or more viewable areas of the display panel as currently non-utilized; and selectively turn off display of illuminated image content from the identified currently non-utilized viewable areas of the display panel.

In another respect, disclosed herein is a system, including: a display panel assembly including a display panel, the display panel assembly displaying illuminated image content from the image content data on the display panel; and at least one programmable integrated circuit programmed to: identify one or more viewable areas of the display panel as currently non-utilized, and selectively turn off display of illuminated image content from the identified currently non-utilized viewable areas of the display panel.

DESCRIPTION OF ILLUSTRATIVE EMBODIMENTS

Figure 1:
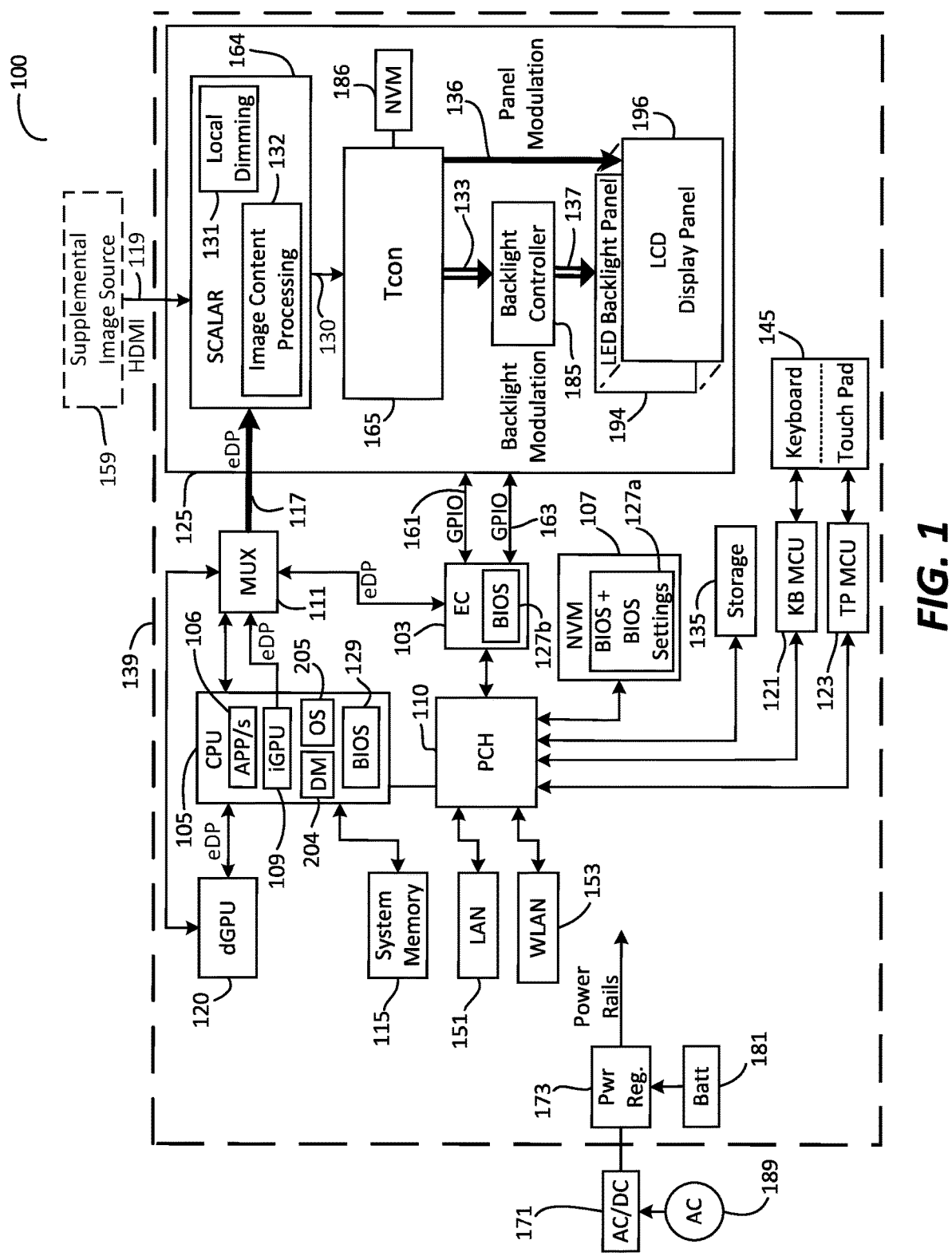
FIG. 1 illustrates a block diagram of an information handling system according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a mobile or portable information handling system such as a notebook computer, laptop computer, or tablet computer having a chassis enclosure 139 which may be, for example, a plastic and/or metal case (e.g., notebook computer case, tablet computer case, smartphone case, etc.) that encloses and contains the illustrated components of system 100. However, in other embodiments (e.g., such as a desktop or tower computer embodiment), one or more components of information handling system 100 (e.g., such as a display panel assembly described further herein) may be separate components that are positioned external to chassis enclosure 139 and coupled in signal communication with internal components of system 100 (e.g., such as a host programmable integrated circuit 105 described further herein).

Still referring to FIG. 1, information handling system includes host programmable integrated circuit 105 which may be a central processing unit CPU such as an Intel processor, Advanced Micro Devices (AMD) processor, or one of many other suitable programmable integrated circuits currently available. In this embodiment, a host programmable integrated circuit in the form of CPU 105 may execute, among other things, a host operating system (OS) 205, display manager (DM) software tool utility 204 (e.g., such as Dell Display Manager available from Dell Technologies, Inc. of Round Rock, Tex.) and system BIOS 129 for system 100. System memory may include main system memory 115 (e.g., volatile random access memory such as DRAM or other suitable form of random access memory) coupled (e.g., via DDR channel) to an integrated memory controller (iMC) of CPU 105 to facilitate memory functions, although it will be understood that a memory controller may be alternatively provided as a separate chip or other circuit in other embodiments. As shown host programmable integrated circuit 105 may also execute one or more user applications 106 (e.g., such as word processing application, spreadsheet application, web browser application, email application, PDF viewer application, slide presentation application, computer gaming application, etc.)

As shown in FIG. 1, CPU 105 itself includes an integrated graphics processing unit (iGPU) 109 and information handling system 100 may also include an optional separate internal discrete graphics processing unit (dGPU) 120 such as a graphics card that is powered by a power source of information handling system (e.g., such as AC adapter 171 and/or internal smart battery pack 181) using internal integrated power supply circuitry and/or internal voltage regulation circuitry 173 of information handling system 100. Examples of different dGPU manufactures and suppliers include, but are not limited to, Nvidia, AMD, etc. Examples of different types of dGPUs include, but are not limited to, Nvidia Quadro, Nvidia Geforce, AMD Radeon, AMD RX, etc.

As further shown in FIG. 1, iGPU 109 of CPU 105 and dGPU 120 may each be coupled to provide data that contains video frames of image content (e.g., video image content) via an audio/visual interface (e.g., such as a multi-channel Embedded DisplayPort "eDP" bus) to a multiplexer (MUX) 111. The image content may be, for example, standard definition resolution (SDR) image content, high definition resolution (HDR) image content, etc. Multiplexer 111 may in turn be coupled to selectively provide frames of image content data 117 (e.g., via an eDP bus) from either iGPU 109 or dGPU 105 to programmable integrated circuits of a liquid crystal display (LCD) display panel assembly 125. LCD display panel assembly 125 may in one embodiment be an integrated display assembly, such as where information handling system 100 is a notebook computer or other mobile or portable information handling system. In other embodiments, LCD display panel assembly 125 may be a separate and external discrete computer monitor that is configured for coupling via one or more computer buses (e.g., HDMI, Display Port (DP), USB-C, etc.) to receive image content from system 100. Also shown in FIG. 1 is an optional supplemental image source 159 (e.g., another information handling system similar to system 100, a computer game console, etc.) that may be optionally present to simultaneously provide other image content as image frames 119 to display panel assembly 125, e.g., in a manner as described further herein.

In the embodiment of FIG. 1, programmable integrated circuits (e.g., microcontrollers and/or microprocessors) of LCD panel assembly include a scalar 164 that is coupled to provide information (e.g., modified image content data and local zone dimming control information for backlights) in scalar output signals 130 to a timing controller (Tcon) 165. In this regard, scalar 164 may process the received image content data 117 using image content processing logic 132 (e.g., by scaling image content data 117 up and/or down, performing color enhancement to image content data 117, etc.) and may generate local zone dimming control information for individual backlight (or blocks of backlights) using local dimming logic 131. As shown, a system embedded controller (EC) 103 may additionally or alternatively provide data that contains frames of image content data to scalar 164 (e.g., via MUX 111).

In the embodiment of FIG. 1, Tcon 165 is coupled as shown to non-volatile memory (NVM) 186 that may store information such as programming, system variables and display port configuration data (DPCD) registers for use by Tcon 165 during operation. As further shown, Tcon 165 is in turn coupled to respond to information in scalar output signals 130 by providing backlight modulation signals 133 to a backlight controller 185 (e.g., which may include a programmable integrated circuit such as a microcontroller) which responds by generating corresponding backlight driver signals 137 for controlling luminance (or brightness) levels of LED backlight panel 194 to illuminate LCD display panel 196, e.g., which may have a viewable area resolution of 1920 pixels×1080 pixels, 3840 pixels×2160 pixels or other greater or lesser resolution. Tcon 165 also converts the image content data received via scalar 164 to image modulation data stream signals 136 that are provided directly to LCD display panel 196 for controlling generation of images for display by LCD display panel 196. It will be understood that the viewable area of display panel 196 is the area of LCD display panel 196 that contains pixels and is therefore capable of displaying images when controlled to do so. As described herein, backlighting of one or more designated portions (e.g., zones or sections) of this viewable area of display panel 196 may be turned off (e.g., so that image content displayed on these designated portion/s of the display panel is not backlit and not visible to a system user), while at the same time backlighting of the remaining portion/s of viewable area of display panel 196 are turned on (e.g., so that image content displayed on these remaining portions is backlit and visible to a system user).

It will be understood that the LCD display panel assembly 125 of FIG. 1 is exemplary only, and that the disclosed systems and methods may be implemented with other display panel configurations. For example, in some exemplary embodiments, the disclosed systems and methods may be implemented with an organic light emitting diode (OLED) display panel assembly having an OLED display panel that includes OLEDs or blocks of OLEDs, in which case individual OLEDs or blocks of OLEDs of the OLED display panel that correspond to identified non-utilized viewable areas of the OLED display panel may be selectively turned off so as to turn off display of illuminated image content from the identified currently non-utilized viewable areas of the OLED display panel.

It will be understood that eDP is just one example of a suitable type of data bus interface that may be employed to route graphics data between internal components of information handling system 100, and that any other suitable type of data bus/es may be employed. Other examples of possible dGPU and/or iGPU configurations, backlight configurations, and display panel configurations and system architectures may be found described and illustrated in U.S. patent application Ser. No. 16/916,970 filed Jun. 30, 2020, in U.S. patent application Ser. No. 17/501,794 filed Oct. 14, 2021, in U.S. Pat. No. 9,558,527, and in U.S. Pat. No. 10,997,687, each of which is incorporated herein by reference in its entirety for all purposes.

In one optional embodiment, image content from CPU 105 may be sourced at any given time either by iGPU 109 or dGPU 120, and may be switchable "on the fly" by multiplexer (MUX) 111 from one to the other, e.g., using drivers of a switchable graphics software utility (e.g., NVidia Optimus available from NVidia of Santa Clara, Calif.; AMD Power Express available from Advanced Micro Devices Inc. of Sunnyvale, Calif.) that may be executing on CPU 105 and that is typically provided by a supplier of the given dGPU 120 that is presently installed in information handling system 100.

As further illustrated in FIG. 1, CPU 105 may be coupled to platform controller hub (PCH) 110 (e.g., by direct media interface "DMI") which may be present to facilitate input/output functions for the CPU 105 with various internal components of information handling system 100. Illustrated examples of other such components include system embedded controller (EC) 103 (e.g., coupled to PCH 110 via low pin count "LPC" connection and optionally to display panel 125 to exchange GPIO signal/s on GPIO conductors 161 and 163), system non-volatile memory (NVM) 107 (e.g., SPI Flash memory device and/or other NVM devices), wireless network controller 153 for wireless local area network (WLAN) or other wireless network communication, integrated network interface card 151 for Ethernet local area network (LAN) or other wired network connection, touchpad microcontroller (MCU) 123, and keyboard microcontroller (MCU) 121. Also shown coupled to PCH 110 are other components of information handling system 100 which include input/output (I/O) devices provided in the form of integrated keyboard and touchpad 145 (which may alternatively be present as separate discrete keyboard and touchpad components), and local system storage 135, e.g., hard drive or other suitable type of permanent storage media such as solid state drive (SSD), optical drives, NVRAM, Flash or any other suitable form of internal storage. Persistent storage (e.g., non-volatile memory 107) may be accessed as needed by EC 103 and/or CPU 105. Such persistent storage 107 may store or contain firmware or other programming (e.g., such as BIOS code and BIOS settings 127*a*) that may be used by host programmable integrated circuit 105 and/or EC 103 (e.g., shown in FIG. 1 executing EC BIOS code 127*b*).

In addition or alternatively to keyboard and touchpad 145, the disclosed systems and methods may be implemented using other types of I/O devices (e.g., such as a mouse, touchscreen, etc.) that may be additionally or alternatively provisioned and coupled to host programmable integrated circuit 105 for user input to information handling system 100. When present, a touchscreen may be integrated into display panel assembly 125. Examples of touchscreen components and operation may be found described, for example, in United States Patent Application publication number 2021/0333084, which is incorporated herein by reference in its entirety for all purposes.

In one embodiment, information handling system 100 may be a mobile battery-powered information handling system having power supply circuitry and/or internal voltage regulation circuitry 173 that provides power to power-consuming components of system 100 via power rails, and that may be selectively coupled to an external source of system (DC) power, for example AC mains 189 and an AC adapter 171. Information handling system may also include an internal DC power source (e.g., smart battery pack) 181 that is configured to provide system power source for the system load of information handling system, e.g., when an external source of system power is not available or not desirable. Further information on battery-powered information handling system architecture and components may be found in U.S. Pat. No. 9,372,521, which is incorporated herein by reference in its entirety. It will also be understood that the particular configuration of FIG. 1 is exemplary only, and that an information handling system may be configured with fewer, additional or alternative components than those illustrated in FIG. 1.

Figure 2A:
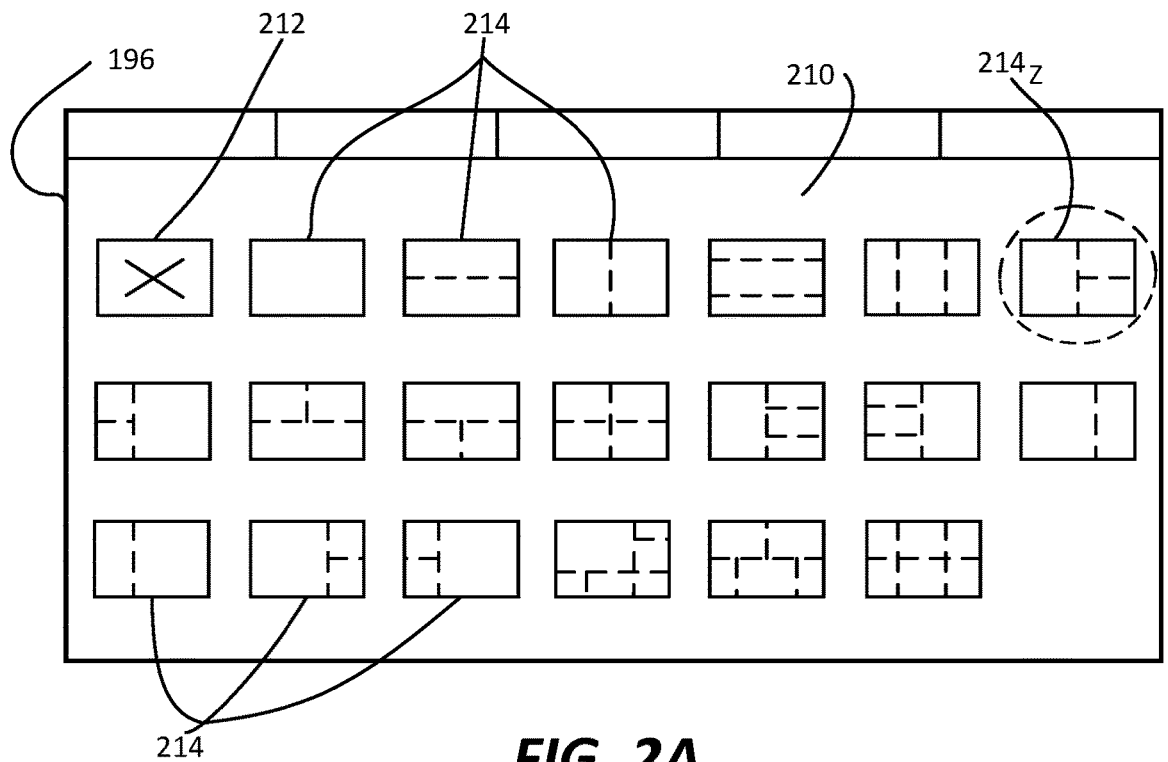
FIG. 2A illustrates a front view of image display on a display panel according to one exemplary embodiment of the disclosed systems and methods.

FIG. 2A illustrates one exemplary embodiment of a partition menu 210 that includes a no-display option 212 and multiple different pre-defined selectable partition schemes 214 that may be displayed to a system user of information handling system 100 by display manager 204 on a viewable area of a display panel such as LCD display panel 196 of display panel assembly 125. One example of such a partition menu 210 is an Easy Arrange (EA) option menu that is provided by Dell Display Manager (DDM) available from Dell Technologies, Inc. of Round Rock, Tex. As further described herein, the display manager (DM) 204 partitions the whole viewable area of LCD display panel 196 into different separate zones according to the different partition schemes 214, and allows a system user to drag and drop any application or folder window into a chosen one of these zones.

Figure 2B:
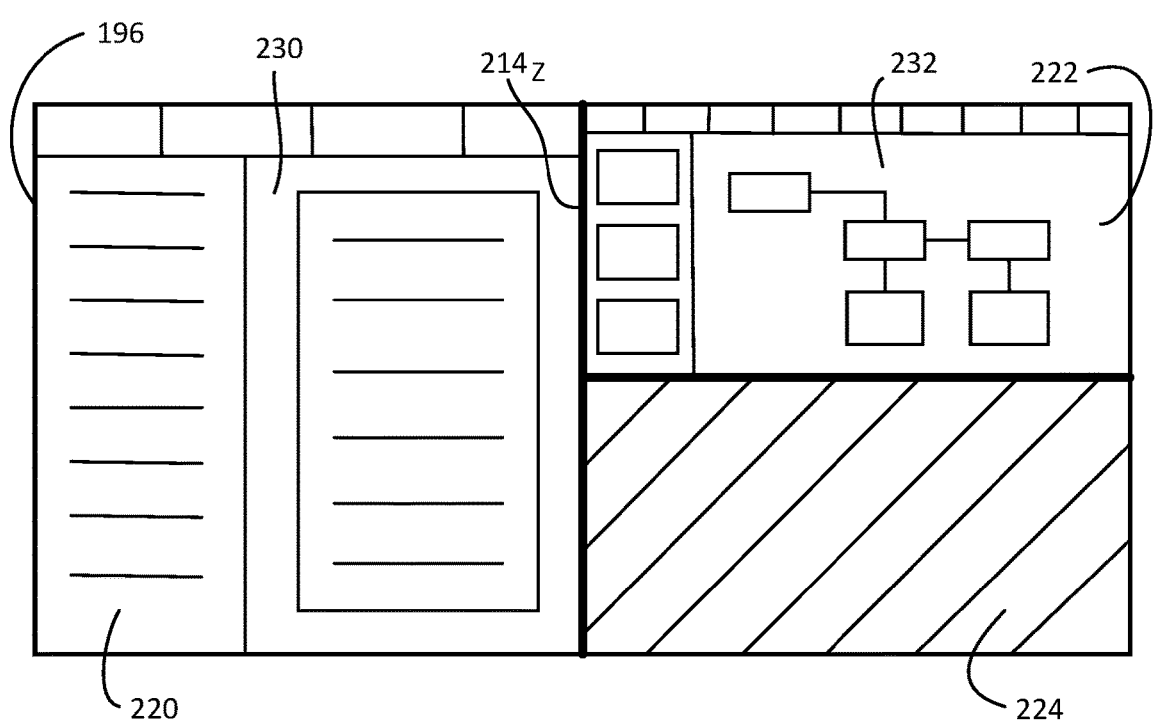
FIG. 2B illustrates a front view of image display on a display panel according to one exemplary embodiment of the disclosed systems and methods.
Figure 2C:
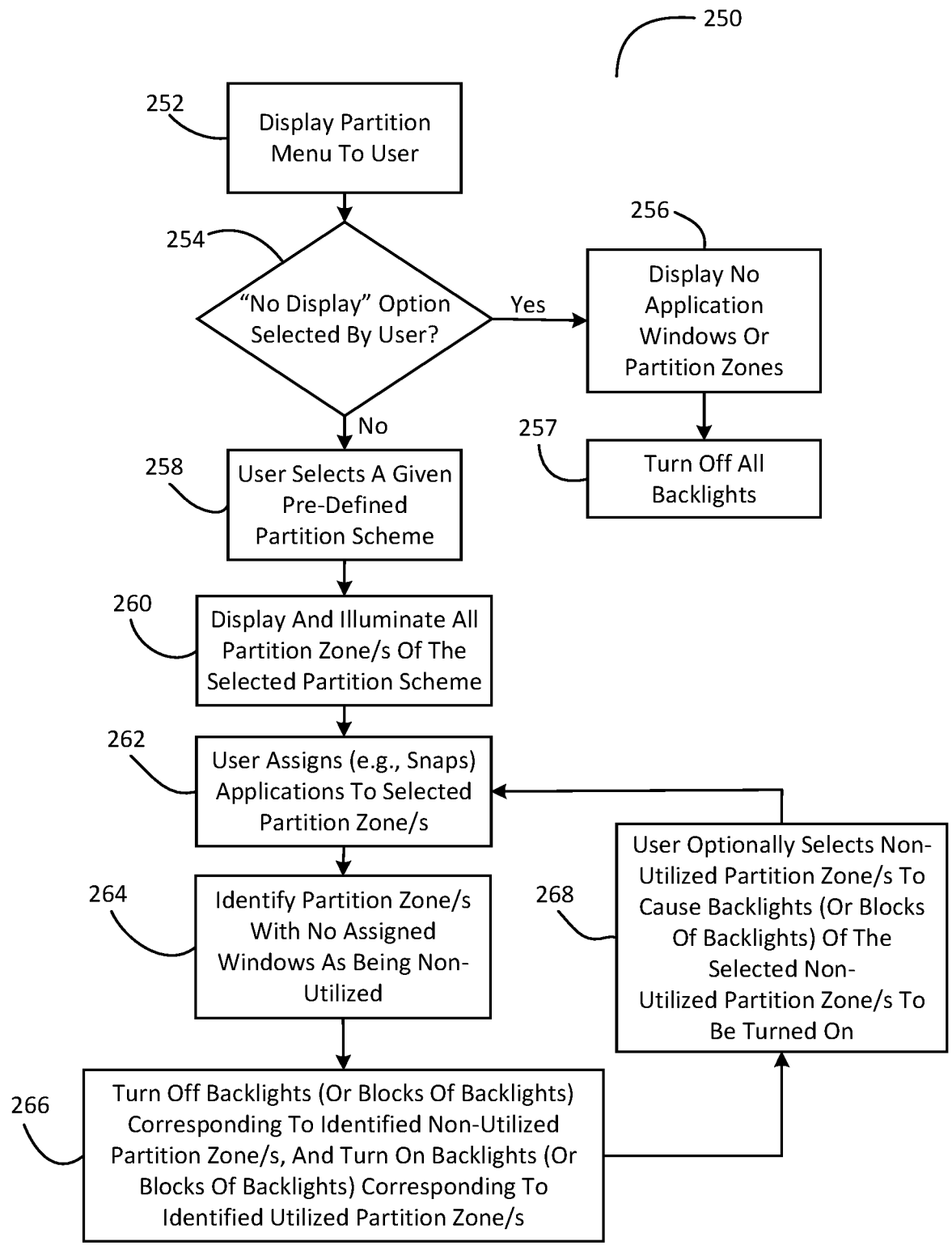
FIG. 2C illustrates a methodology according to one exemplary embodiment of the disclosed systems and methods.

FIG. 2C illustrates one exemplary embodiment of methodology 250 that may be implemented (e.g., by logic executed by DM 204 in conjunction with logic executed by scalar 164, Tcon 165 and/or backlight controller 185) and partition menu 210 of FIG. 2A to identify viewable zones of a display panel that are currently not utilized by a user, and then to selectively and dynamically turn off backlights (or blocks of backlights) that are configured to illuminate viewable areas of the display panel that correspond to these non-utilized viewable zones. As shown in FIG. 2A, partition menu 210 that includes a no-display option 212 and multiple different pre-defined selectable partition schemes 214 that may be displayed to a system user of information handling system 100 by display manager 204 in block 252 of FIG. 2C. As described further herein, system user may use input/output (I/O) devices of system 100 to select either a no display option 212 or a given partition scheme 214 which suits their work. As shown in FIG. 2A, each of selectable partition schemes 214 includes a different number and/or size of partition zones into which different application windows may be assigned (or "snapped") by the system user. As described in more detail below, when a selectable partition scheme 214 is selected, the system user may then assign (by moving or putting) different displayed application windows into the different displayed zones of the selected given partition scheme 214. Although described with reference to LCD display panel 196, it will be understood that the disclosed systems and methods may be similarly implemented for partitioning and displaying image content on an OLED display panel assembly that may be alternatively coupled to information handling system 100.

Still referring to FIGS. 2A and 2C, if the no-display option 212 is selected by the system user in block 254 of FIG. 2C, then DM 204 identifies the entire viewable area of display panel 196 as non-utilized and responds in block 256 by providing command information via OS 205 in image content data 117 to scalar 164 and Tcon 165 to cause removal of all application windows from display panel 196 (i.e., so that no application windows or partition zones are displayed on the viewable area of display panel 196). In block 257, DM 204 provides command information via OS 205 in image content data 117 to scalar 164 and Tcon 165 to cause all backlights (or blocks of backlights) of display panel 125 to be turned off. However, if the system user does not select the no-display option 212 in block 254, but instead selects a given one of the different pre-defined selectable partition schemes 214 in block 258 of FIG. 2C (e.g., using system I/O devices such as keyboard and touchpad 145, or provided mouse or touchscreen), then in block 260 of FIG. 2C display manager 204 provides command information via OS 205 in image content data 117 to scalar 164 and Tcon 165 to cause display panel 196 to initially display and illuminate with backlighting of all the pre-defined partition zones of the selected pre-defined selectable partition scheme 214.

For example, FIG. 2A illustrates the selection of the circled pre-defined selectable partition scheme $214_Z$ in block 258. FIG. 2B illustrates one embodiment in which display panel 196 has been configured in block 260 of FIG. 2C to display the individual partition zones of selected partition scheme $214_Z$ from FIG. 2A. In this embodiment, selected partition scheme $214_Z$ includes three pre-defined zones 220, 222 and 224, to each of which the system user may decide whether or not to snap at least one application window corresponding to a user application 106 that is currently executing on host programmable integrated circuit 105.

In block 262 of FIG. 2C, the system user may assign (by moving or putting) different displayed application windows into the different displayed zones of the selected given partition scheme 214. In block 264, any zone of the selected partition scheme 214 (e.g., selected partition scheme $214_Z$) to which no application window has been currently assigned (e.g., snapped) is identified by DM 204 as an inactive or non-utilized viewable zone of display panel 196, and in block 266 its corresponding backlights are therefore turned off by command information in image content data 117 provided by DM 204 via OS 205 to scalar 164 and Tcon 165 so that inactive or non-utilized viewable zone of display panel 196 is not illuminated. At the same time, any zone of a selected partition scheme 214 (e.g., zone of selected partition scheme $214_Z$) to which at least one application window has been currently assigned (e.g., snapped) is identified by DM 204 as an active utilized viewable zone of display panel 196, and therefore DM 204 also provides command information via OS 205 in image content data 117 to scalar 164 and Tcon 165 in block 266 to cause the corresponding backlights (or blocks of backlights) of any such identified active utilized viewable zone/s of display panel 196 to be (or to remain) turned on so that it is displayed on display panel 196 to the system user.

FIG. 2B illustrates one embodiment of the display of the selected pre-defined partition scheme $214_Z$ on display panel

196 with identified non-utilized viewable zone 224 not illuminated (represented by cross-hatching) by its corresponding backlights (or blocks of backlights) and with identified active utilized viewable area/s 220 and 222 of display panel 196 illuminated by its corresponding backlights (or blocks of backlights). It will be understood that FIG. 2B is exemplary only, and that the disclosed systems and methods may be implemented using the particular number and configuration of zones of any other selected partition scheme 214 from partition menu 210 (e.g., such as illustrated in FIG. 2A) or using any other selected partition scheme configuration not shown. In another embodiment, the disclosed system and methods may be implemented without a partition menu 210 of FIG. 2A, i.e., with only a single available partition scheme that has a fixed number and configuration of pre-designated zones that are not-selectable.

Still referring to the embodiment of FIG. 2B, the system user has currently snapped a different application window into each of zones 220 and 222 (each of which corresponds to an application 106 that is currently running on host programmable integrated circuit 105), but has not currently snapped any application window into the remaining zone 224. Since zone 224 does not currently have an application window snapped to it, is identified as (considered to be) a non-utilized zone by DM 204, and its corresponding backlights (or blocks of backlights) are turned off by DM 204 so that it is non-illuminated and dark (illustrated by cross-hatching in FIG. 2B) on display panel 196. However, at the same time DM 204 determines that application windows 230 and 232 are currently assigned to respective zones 220 and 232, and therefore backlights (or blocks of backlights) corresponding to zones 220 and 222 are turned on by DM 204 to illuminate their respective assigned application windows 230 and 232 on display panel 196 so that windows 230 and 232 are displayed on display panel 196 and visible to the system user.

As described above, assignment of application windows to respective zones of a selected partition scheme $214_Z$ (e.g., via window snapping action) may be implemented in one embodiment by DM 204 in response to system user input, e.g., that is entered to host programmable integrated circuit 105 by the current system user via I/O devices of system 100. In such an embodiment, DM 204 therefore knows which application window has been currently snapped into which zone of the selected partition scheme $214_Z$, and also knows which (if any) zone/s of the selected partition scheme $214_Z$ are currently non-utilized (i.e., have no currently assigned application window). Moreover, the identity (e.g., coordinates) of the location/s of any determined non-utilized zone/s of the currently-selected partition scheme $214_Z$ is also therefore known by DM 204 and may then be communicated to the scalar 164 by DM 204. In response to the identity (e.g., coordinates) of the location/s of any determined non-utilized zone/s of the currently-selected partition scheme $214_Z$, scalar 164 may use local dimming logic 131 to generate local zone dimming control information that identifies backlights (or blocks of backlights) corresponding to the determined non-utilized zone/s, and provide this local zone dimming control information in scalar output signals 130 to Tcon 165 to cause Tcon 165 to dim or turn off the particular backlights (or blocks of backlights) that corresponds to these determined non-utilized zone/s.

In a further embodiment shown in FIG. 2C, a system user may be enabled in optional block 268 to selectively turn on backlights (or blocks of backlights) corresponding to non-utilized zone/s of the currently-selected partition scheme $214_Z$, e.g., such as by clicking a mouse, touchscreen or touchpad 145 in the area of a non-utilized zone/s which is outside the areas of the currently-utilized zones containing assigned (e.g., snapped) windows, or by entering keystroke commands to keyboard 145, e.g., Win+Tab or Alt+Tab to view running applications and application windows. In either case, DM 204 may respond in block 268 by providing command information via OS 205 in image content data 117 to indicate to the scalar 164 to turn on the backlights (or blocks of backlights) corresponding to the non-utilized zone/s, e.g., to cause scalar 164 to provide local zone dimming control information to Tcon 165 in scalar output signals 130 to turn on the backlights (or blocks of backlights) corresponding to the non-utilized zone/s.

It will be understood that blocks 262 to 266 (and optional block 268) of FIG. 2C may iteratively repeat as shown, e.g., such that in the embodiment of FIG. 2B the system user may use the I/O devices of system 100 to dynamically change the current assignment of windows to zones 220, 222 and/or 224 (and/or control which backlights or blocks of backlights are turned on) in real time, and DM 204 will dynamically respond accordingly in real time by turning on or turning off their respective backlights (or blocks of backlights) as needed to match the current system user assignment of application windows to partition zones 220, 222 and/or 224, and or other command from the user to turn on backlights (or blocks of backlights) of user-selected partition zones.

For example, the system user may re-assign (e.g., by snapping) window 230 from zone 220 to zone 224, in which case DM 204 will respond by turning on the backlights (or blocks of backlights) of zone 224 to display window 230 to the system user in zone 224, and turning off the backlights (or blocks of backlights) of zone 220 so that it goes dark or non-illuminated. As another example, the system user may assign (e.g., by snapping) a newly opened window to zone 224 without re-assigning windows 230 and 232, in which case DM 204 will respond by turning on the backlights (or blocks of backlights) of zone 224 to display the newly opened window to the system user, while keeping the backlights (or blocks of backlights) of zones 220 and 222 turned on to continue displaying their respective windows 230 and 232 to the system user. As another example, the system user may close the application displaying window 230 in zone 220 so that no window assigned to zone 220, in which case DM 204 will respond by turning off the backlights (or blocks of backlights) of zone 220 so that it goes dark or non-illuminated, while continuing to keep the backlights (or blocks of backlights) of zone 222 turned on to illuminate window 232.

It will be understood that the identity (e.g., coordinates) of the location/s of non-utilized zone/s of a current partition scheme 214 may be communicated as command information in image content data 117 from DM 204 to scalar 164 in any suitable manner. In one exemplary embodiment, a designated RGB value or designated gray level value may be used as command information that is conveyed as a code in data 117 from DM 204 to scalar 164 to specify the identity (e.g., coordinates) of the location/s of non-utilized zone/s of a current partition scheme 214. For example, DM 204 may overlay a particular pre-defined RGB color or gray level value onto the location/s of any zone/s of a current partition scheme 214 that are determined by DM 204 to be non-utilized, (e.g., a pre-defined RGB value of (5,5,5) may be used to overlay a zone/s of a current partition scheme 214 to indicate that the zone/s is non-utilized). In such an embodiment, any other zones of the current partition scheme 214 that do not have the pre-defined RGB or gray level value received from DM 204 are considered utilized.

In another exemplary embodiment, DM 204 may communicate the identity (e.g., coordinates) of the location/s of non-utilized zone/s of a current partition scheme 214 as command information to the scalar 164 via MCCS (Monitor Control Command Set) and VCP (Virtual Control Panel) codes in image content data 117. In such an embodiment, firmware or other logic executing on scalar 164 may be programmed to "read" the location identity information (e.g., coordinates), e.g., from a custom-defined VCP code register. Scalar 164 with its local dimming engine (e.g., algorithm) 131 may in turn map this identified location of the non-utilized zone/s of the current partition scheme 214 to the corresponding backlight zone/s of LED backlight panel 194, and turn off the backlights (or blocks of backlights) of these corresponding backlight zone/s of LED backlight panel 194. In this regard, local dimming logic 131 may utilize a modified local dimming algorithm that is modified to perform the capabilities described herein. This is in contrast to a conventional local dimming algorithm that performs conventional local dimming to display various DisplayHDR test patterns and to improve the apparent image contrast ratio.

Figure 3A:
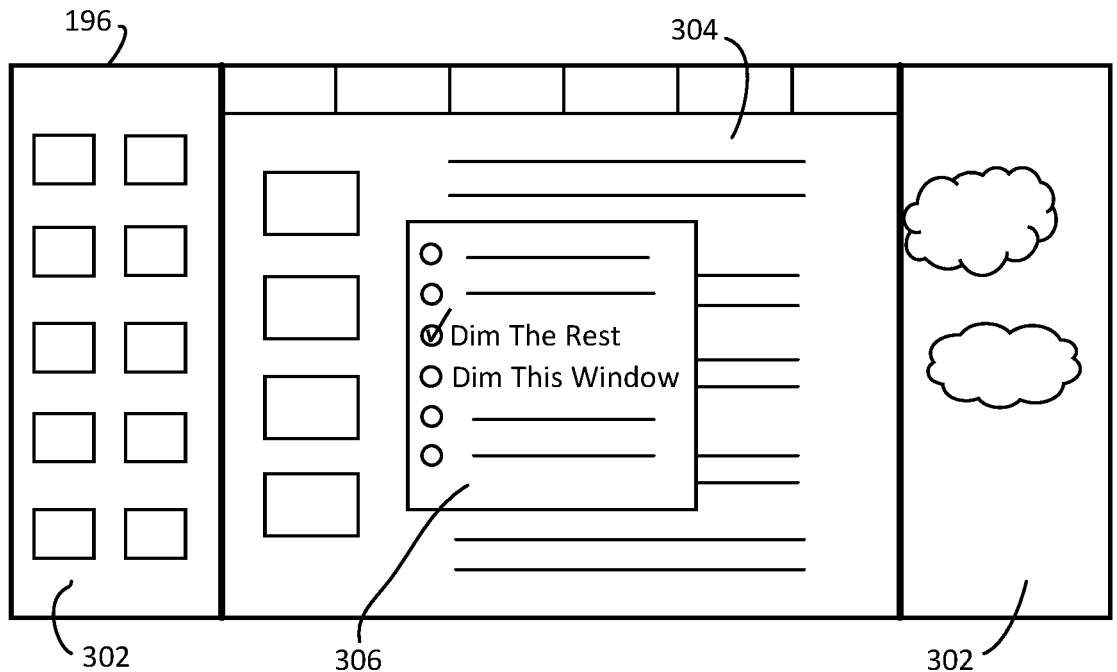
FIG. 3A illustrates a front view of image display on a display panel according to one exemplary embodiment of the disclosed systems and methods.
Figure 3B:
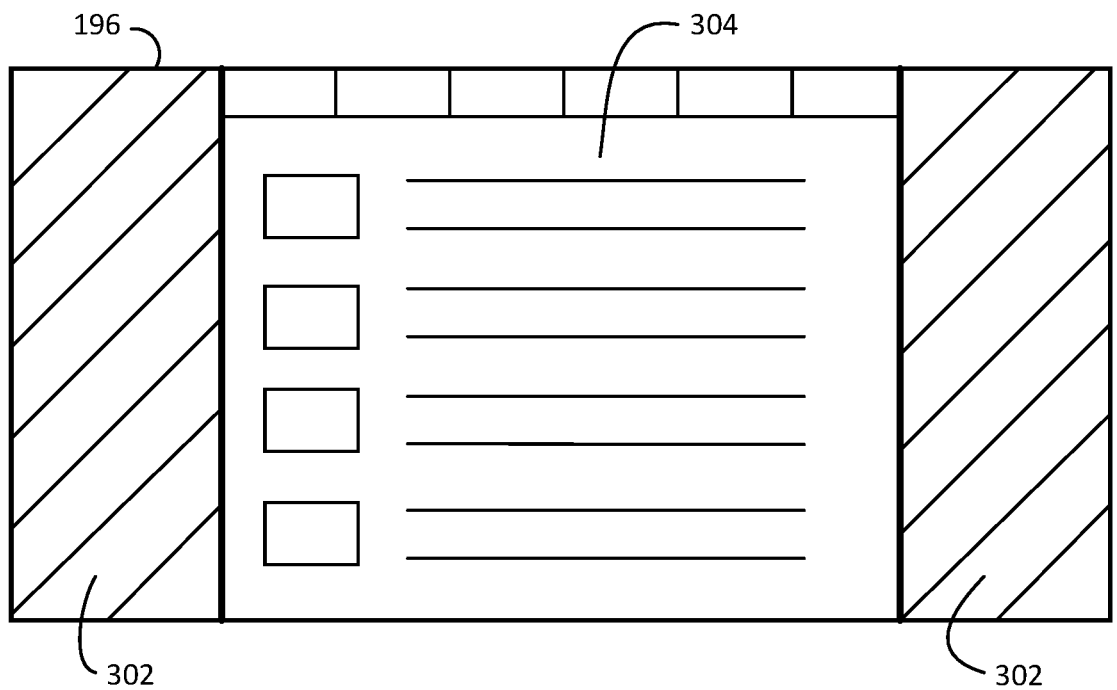
FIG. 3B illustrates a front view of image display on a display panel according to one exemplary embodiment of the disclosed systems and methods.
Figure 3C:
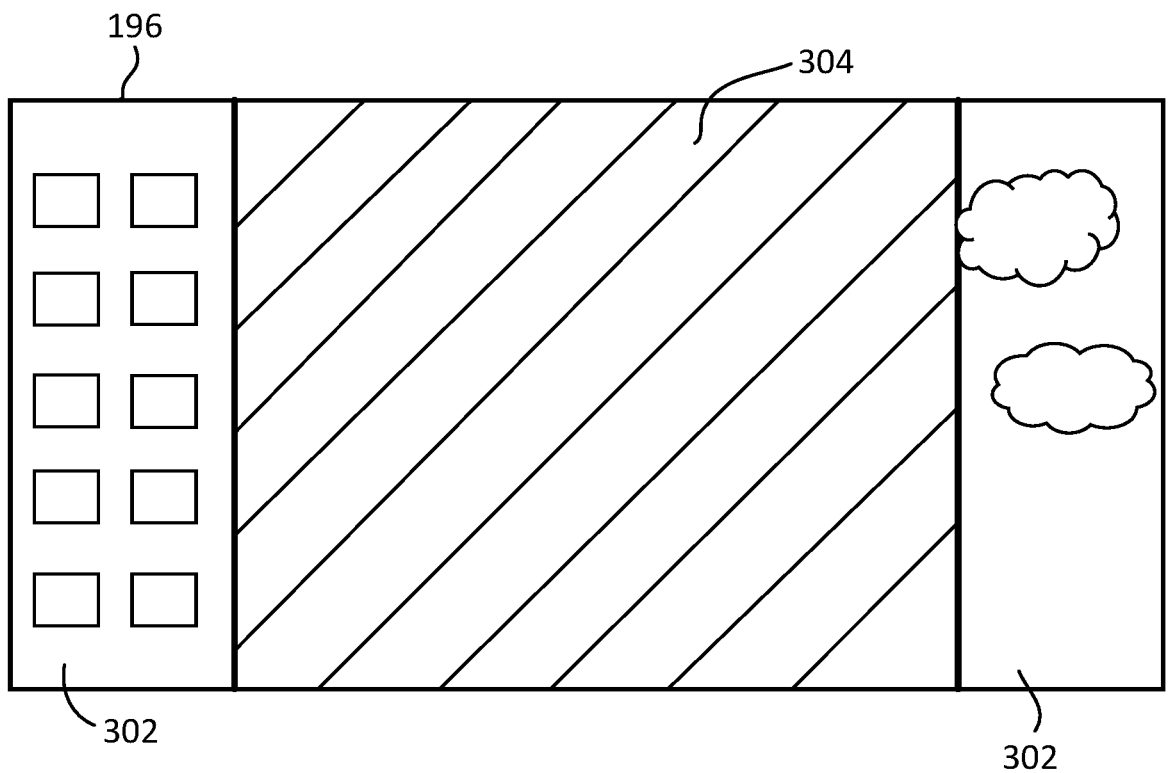
FIG. 3C illustrates a front view of image display on a display panel according to one exemplary embodiment of the disclosed systems and methods.
Figure 3D:
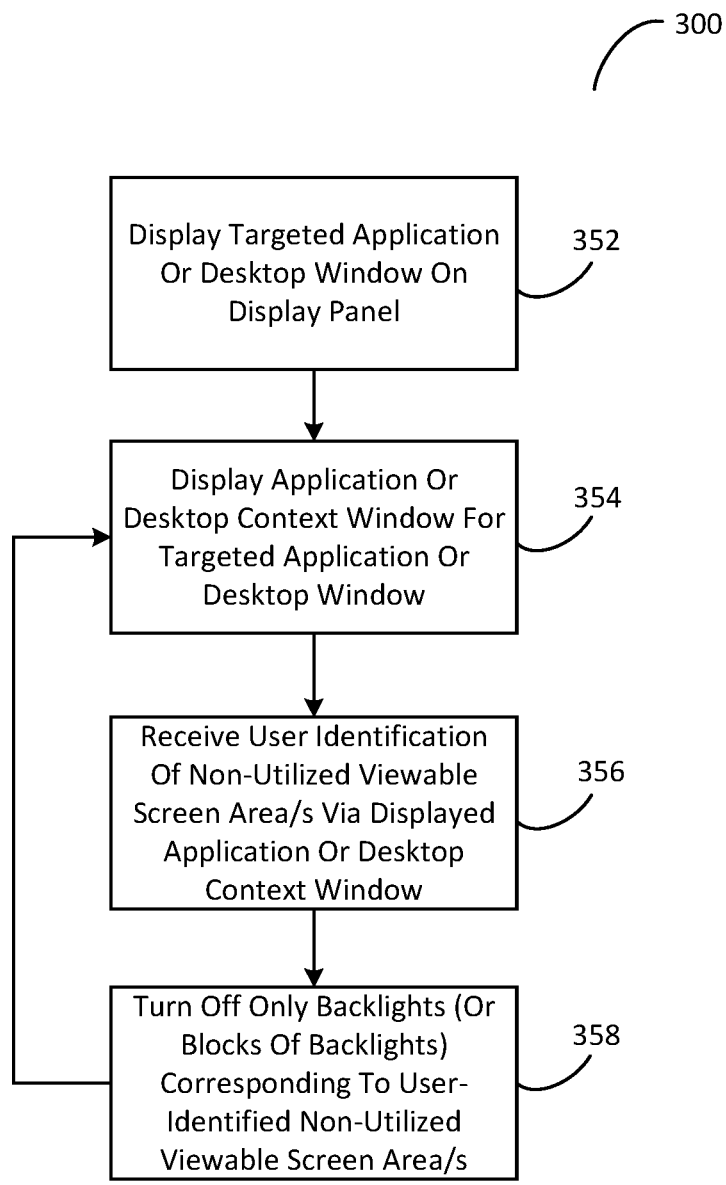
FIG. 3D illustrates a methodology according to one exemplary embodiment of the disclosed systems and methods.

FIGS. 3A to 3D illustrate exemplary embodiments in which a system user is given the ability to decide to turn off only those backlights (or blocks of backlights) corresponding to user-identified non-utilized (e.g., unattended or out-of-interest) viewable screen area/s of LCD display panel 196 of display panel 125. FIG. 3D illustrates one exemplary embodiment of a methodology 300 that may be implemented (e.g., by logic executed by DM 204 in conjunction with logic executed by scalar 164, Tcon 165 and/or backlight controller 185) to implement the embodiments of FIGS. 3A to 3D. In one embodiment, DM 204 may acquire the positions, sizes and Z-order of all running application windows and the desktop area from OS 205. DM 204 may use this acquired information to calculate the respective currently affected identified non-utilized and/or utilized viewable areas of the display panel 196, and may communicate the appropriate backlight controls (e.g., normal/dim/off) in command information provided via OS 205 in image content data 117 to scalar 164.

In the embodiment of FIG. 3A, image content of a targeted application window 304 of an executing application 106 is initially displayed overlying image content of a desktop area 302 on a viewable screen area of LCD display panel 196 in block 352 of FIG. 3D. It will be understood that a targeted application window 403 may also be displayed overlying image content of one or more other application windows on top of a desktop area 302. Also shown in FIG. 3A is an application context window 306 that is displayed overlying the targeted application window 304 in block 354 of FIG. 3D, e.g., in response to a user click of a right button of a touchpad 145 or mouse of system 100 within the displayed area of targeted application 304. As shown, application context window 306 of this embodiment includes user-selectable backlight control options "Dim the Rest" and "Dim this Window", e.g., together with any other pre-defined application context options appropriate to the current application window 304. These control options of this embodiment may be provided to allow the system user to focus on only certain application window/s and to dim the rest of screen when that is the system user's preference.

Still referring to FIG. 3A, the displayed user-selectable backlight control options of application context window 306 are displayed as shown to allow the system user to adjust where backlights (or blocks of backlights) are turned off on the viewable area of display panel 196 with respect to a targeted running application window 304. In this regard, the system user may identify non-utilized viewable screen area/s by selecting one of these displayed user-selectable backlight control options in block 356 of FIG. 3D. It will be understood that user-selectable backlight control options of an application context window may alternatively include only one of these backlight control options (i.e., "Dim the Rest" and "Dim this Window"), or may alternatively or additionally include any other pre-defined user-selectable backlight control options.

The illustrated check mark in FIG. 3A shows that system user has selected the "Dim the Rest" backlight control option of application window context window 306 in block 356 of FIG. 3D to identify that the user has selected current non-utilized viewable screen area/s to include all viewable areas of display panel 196 that are outside application window 304 (desktop area 302 in FIG. 3A), and to identify that the display panel viewable area of displayed application window 304 is currently utilized.

FIG. 3B illustrates the resulting displayed backlighting effects of display panel 196 that are implemented in block 358 of FIG. 3D in response to the user selecting the "Dim the Rest" backlight control option of application window context window 306 of FIG. 3A. In this regard, DM 204 responds to the system user selection of "Dim the Rest" in block 356 of FIG. 3D by providing command information via OS 205 in image content data 117 to scalar 164 and Tcon 165 that causes only backlights (or blocks of backlights) having location coordinates not corresponding to the targeted application window 304 to be tuned off as shown in FIG. 3B, while at the same time all backlights (or blocks of backlights) corresponding to location coordinates of the targeted application window 304 remain turned on. This is illustrated in FIG. 3B where the viewable areas of desktop 302 lying outside target application window 304 are not illuminated and are instead dark so that the image content of these desktop areas are not visible (e.g., illustrated in FIG. 3B by cross hatching), while at the same all the image content of the displayed viewable area of target application window 304 is illuminated by backlighting and are therefore visible.

FIG. 3C illustrates the resulting displayed backlighting effects of display panel 196 that are implemented by command information provided by image content data 117 from DM 204 via OS 205 in block 358 of FIG. 3D in response to the user selecting the "Dim this Window" backlight control option of application window context window 306 of FIG. 3A. In this example, the image content of all the viewable area corresponding to location coordinates of target application window 304 is not illuminated and is instead dark so that the image content of target application window 304 is not visible (e.g., illustrated in FIG. 3C by cross hatching), while at the same the image content of the viewable areas of desktop 302 corresponding to location coordinates lying outside target application window 304 remains illuminated by backlighting and are therefore visible.

In one embodiment, the system user may be enabled to change (e.g., select or deselect) the backlight control options of an application window context window 306 of FIG. 3A in real time, and DM 204 may respond in real time to such a backlight control option by providing command information via OS 205 in image content data 117 to scalar 164 and Tcon 165 to turn off and/or turn on backlights (or blocks of backlights) to achieve the backlighting condition specified by the backlight control option change. This is illustrated by blocks 354 to 358 of FIG. 3D iteratively repeating.

In a further embodiment, the displayed desktop area 302 of FIG. 3A may be treated as a window layer that lies behind all other overlying application windows, such as application window 304 in FIG. 3A. In this embodiment, the backlighting of viewable areas of desktop 302 may be controlled in a similar manner as described for an application window 304 in relation to FIGS. 3B and 3C, e.g., using methodology 300 of FIG. 3D. In this regard, a desktop context window for desktop 302 may be displayed overlying a displayed area of the desktop 302 in block 354 of FIG. 3D, e.g., in response to a user click of a right button of a touchpad 145 or mouse of system 100 within a displayed area of desktop 302 that is not overlain and obscured by other image content (e.g., such as application 304 of FIG. 3A).

In similar manner as described above for targeted application window 304, a desktop context window for desktop 302 may be provided and displayed in block 354 of FIG. 3D to include similar user-selectable backlight control options such as "Dim the Rest" and "Dim this Window" (or "Dim this Desktop"), e.g., together with any other pre-defined desktop context options appropriate to the desktop 302. Similar to described for application window 304, the system user may select the "Dim the Rest" backlight control option of a displayed desktop window context window in block 356 of FIG. 3D to identify that the user has selected current non-utilized viewable screen area/s to include all viewable areas of display panel 196 that overlay (and obscure) desktop area 302 (e.g., such as application window 304 in FIG. 3A), and to identify that the display panel viewable area/s of desktop 302 that is not so overlain and is visible (e.g., desktop area/s lying outside application 304 of FIG. 3A) is a currently utilized viewable screen area. DM 204 may respond to this system user selection in block 358 of FIG. 3D by providing command information via OS 205 in image content data 117 to scalar 164 and Tcon 165 that causes all backlights (or blocks of backlights) corresponding to location coordinates of viewable areas of display panel 196 that are overlaying and obscuring desktop 302 (e.g., such as application window 304 of FIG. 3A) to be tuned off while at the same time non-overlain areas of desktop 302 (e.g., desktop areas lying outside application 304 of FIG. 3A) remain illuminated by backlighting, e.g., to achieve the same visual effect shown in FIG. 3C.

Similarly, the system user may select the "Dim this Window" (or "Dim this Desktop") backlight control option of a displayed desktop window context window in block 356 of FIG. 3D to identify that the user has selected current non-utilized viewable screen area/s to include all viewable areas of display panel 196 on which desktop area 302 is not overlain and visible (e.g., area/s lying outside application 304 of FIG. 3A), and to identify that the display panel viewable area/s that overlay and obscure desktop 302 (such as application window 304 in FIG. 3A) is a currently utilized viewable screen area. DM 204 may respond to this system user selection in block 358 of FIG. 3D by providing command information via OS 205 in image content data 117 to scalar 164 and Tcon 165 that causes all backlights (or blocks of backlights) corresponding to location coordinates of viewable areas of display panel 196 on which desktop area 302 is not overlain and is visible (e.g., areas lying outside application 304 of FIG. 3A) to be tuned off while at the same time areas containing image content that overlay and obscure desktop 302 (e.g., application 304 of FIG. 3A) remain illuminated by backlighting, e.g., to achieve the same visual effect shown in FIG. 3B.

Figure 4A:
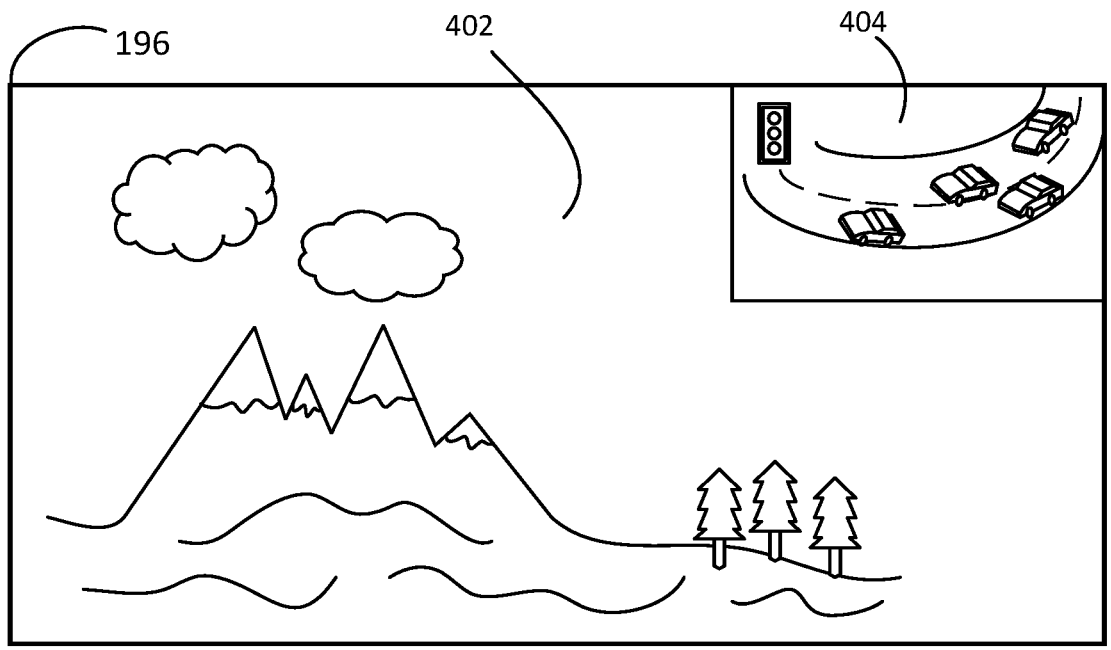
FIG. 4A illustrates a front view of image display on a display panel according to one exemplary embodiment of the disclosed systems and methods.
Figure 4B:
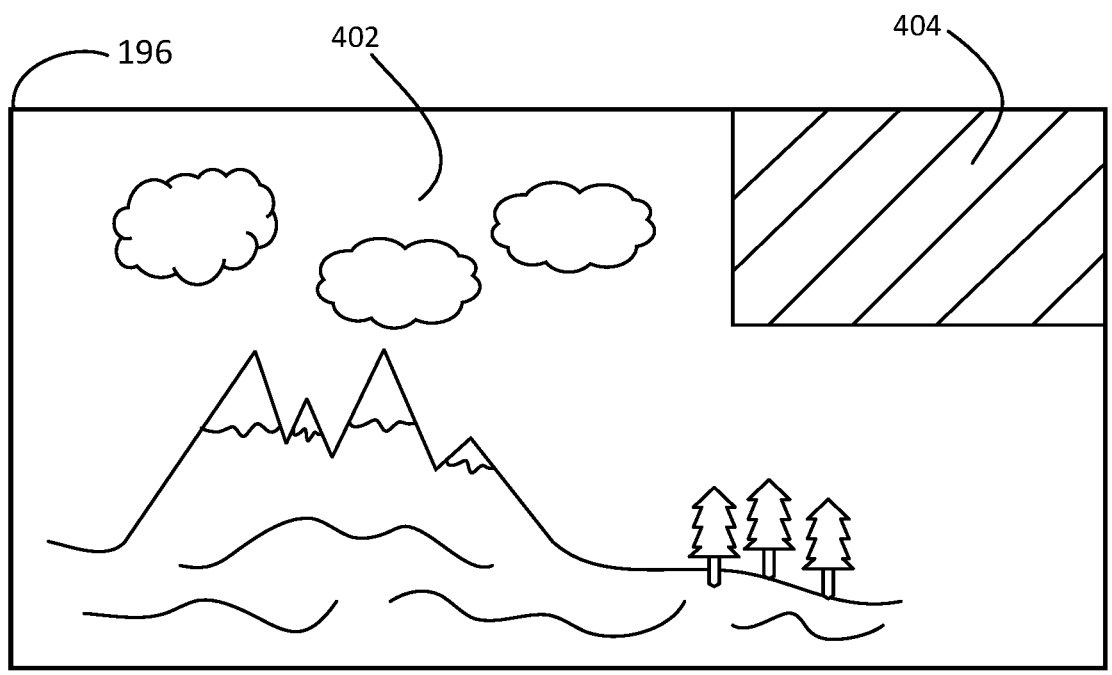
FIG. 4B illustrates a front view of image display on a display panel according to one exemplary embodiment of the disclosed systems and methods.
Figure 4C:
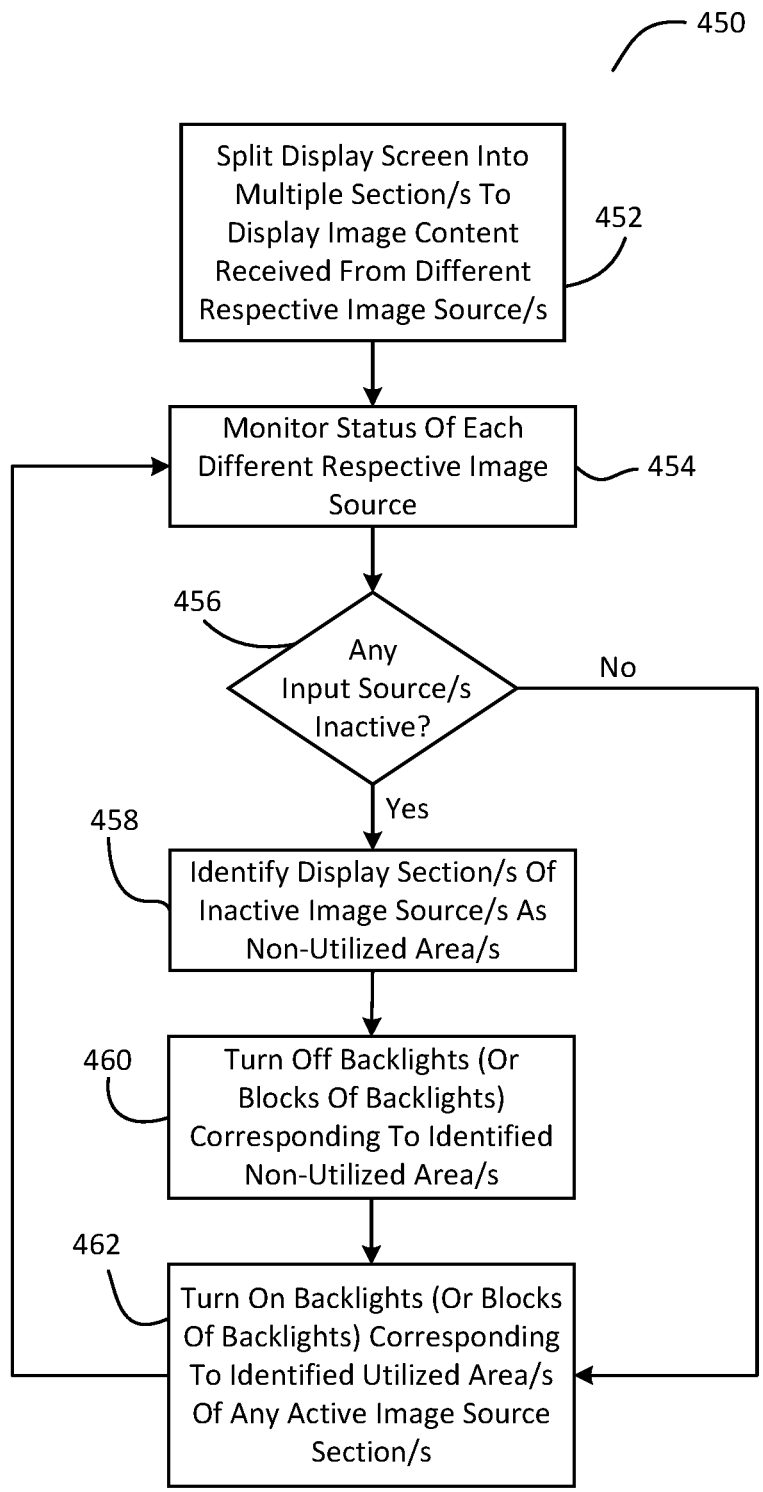
FIG. 4C illustrates a methodology according to one exemplary embodiment of the disclosed systems and methods.

FIGS. 4A, 4B and 4C another exemplary embodiment which may be implemented (e.g., by scalar 164) to identify non-utilized viewable screen area/s of display panel 196 that correspond to an inactive picture-in-picture (PIP) or picture-by-picture (PBP) image source. FIG. 4C illustrates one embodiment of methodology 450 corresponding to this embodiment. As shown in FIG. 4A, in block 452 of FIG. 4C, the viewable area of display panel 196 is split into multiple sections, in this case a section 402 and a section 404, with each different section corresponding to a different input image source. In FIG. 4A, section 402 of display panel 196 displays first image content (e.g., webcam view of mountains received as a network stream via LAN 151 or WLAN 153) provided as video frames 117 in a first input signal by a first image source that may be either iGPU 109 or dGPU 120 of system 100 of FIG. 1. At the same time, in block 452 section 404 of display panel 196 simultaneously displays second image content (e.g., a car racing video game) provided as second image frames 119 in a second input signal (e.g., such as across a High-Definition Multimedia Interface (HDMI)) from a GPU of an optional second and different supplemental image source 159, e.g., such as a game console, another information handling system similar to system 100, etc. Although FIGS. 4A, 4B and 4C illustrate an embodiment in which the viewable area of display panel 196 is split into two sections that each correspond to one of two different respective image sources, it will be understood that similar methodology may be implemented for embodiments where the viewable area of display panel 196 is split into three or more sections that each correspond to one of three or more different respective image sources.

In block 454 of methodology 450, local dimming logic 131 of scalar 164 may be programmed to continuously monitor the respective input signal and therefore the status (i.e., active or inactive) of each of the first image source 109/120 and the second image source 159 in block 454. Any time that local dimming logic 131 of scalar 164 detects in block 456 that either one of first image source 109/120 or second image source 159 is inactive and currently providing no input signal (with its respective image frames) to scalar 164, then in block 458 local dimming logic 131 of scalar 164 identifies its corresponding display panel section 402 or 404 as being a currently non-utilized area of display panel 196. Local dimming logic 131 of scalar 164 then responds in block 460 by providing local zone dimming control information in scalar output signals 130 to Tcon 165 to cause backlights (or blocks of backlights) corresponding to the identified non-utilized section to be turned off for as long as its corresponding image source 109/120 or 159 remains inactive.

Whether or not any scalar 164 detects in block 456 that either one of first image source 109/120 or second image source 159 is inactive, methodology proceeds to block 462 where scalar 164 also detects whether either one of first image source 109/120 or second image source 159 is active and currently providing an input signal (with its respective image frames) to scalar 164. Scalar 164 then identifies its corresponding display panel section 402 or 404 as being a currently utilized area of display panel 196 and continues (or begins) to provide local zone dimming control information in scalar output signals 130 to turn on the backlights (or blocks of backlights) corresponding to identified utilized section of display panel 196 so that the image content of utilized section 402 remains illuminated as shown in FIG. 4B. Methodology 450 then iteratively repeats to block 454 in order to continuously monitor the respective input signal and status of each of the first image source 109/120 and the second image source 159, and to turn off or turn on backlights (or blocks or backlights) according to the most recent detected current status of each of the first image source 109/120 and the second image source 159.

For example, in FIG. 4B scalar 164 detects in block 456 that second image source 159 is inactive (i.e., currently providing no second signal with second image frames 119) and responds in block 460 by providing local zone dimming control information in scalar output signals 130 to turn off backlights (or blocks of backlights) of the area of non-utilized section 404 so that non-utilized section 404 is not illuminated (represented by cross-hatching in FIG. 4B). At the same time, scalar 164 detects that first image source 109/120 is active (i.e., currently providing first signal with first image frames 117) and responds in block 462 by identifying section 402 as a utilized area of display panel 196 and continues (or begins) to provide local zone dimming control information in scalar output signals 130 to turn on backlights (or blocks of backlights) corresponding to the area of utilized section 402 of display panel 196 so that the image content of utilized section 402 remains illuminated as shown in FIG. 4B.

Figure 5:
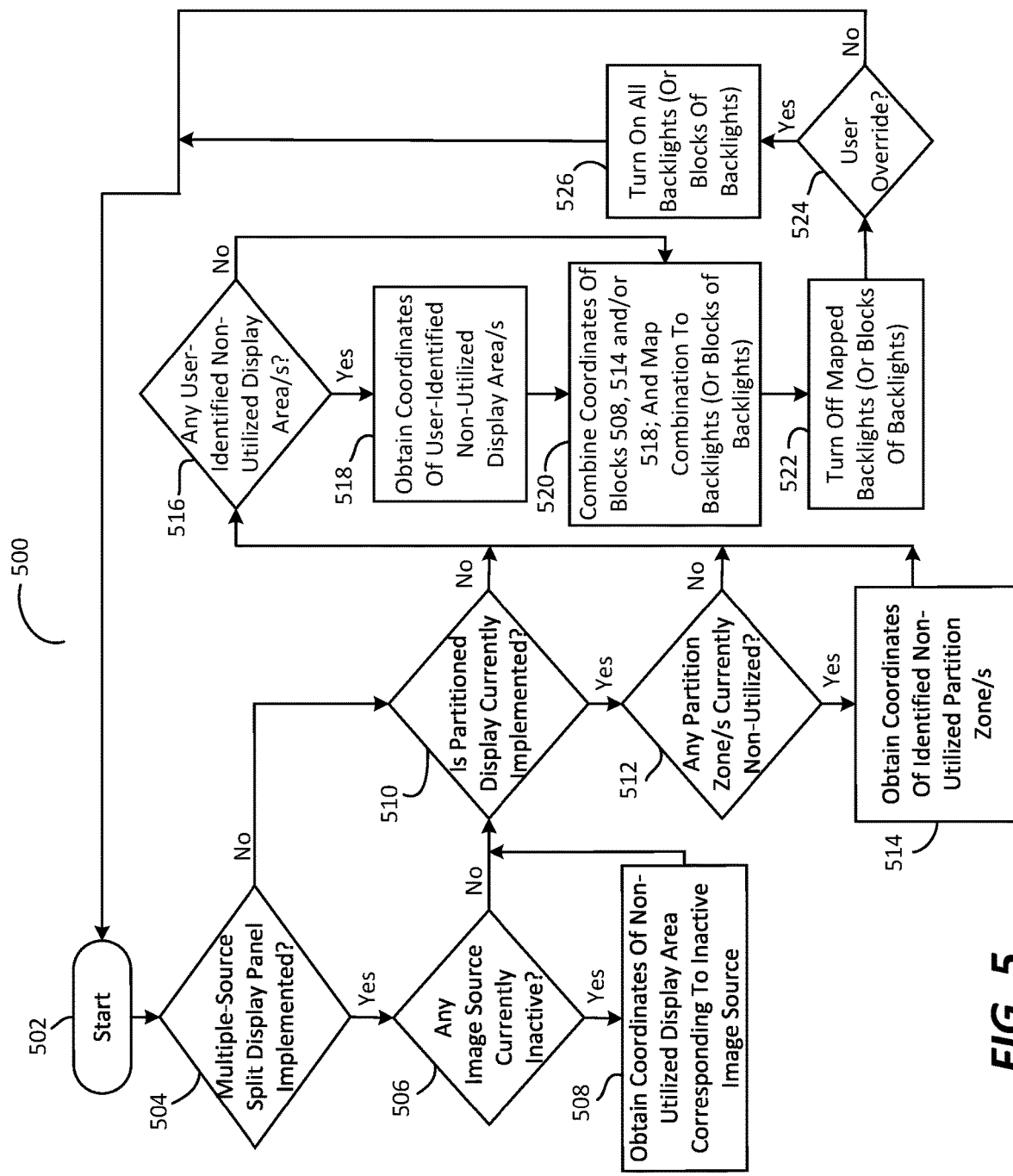
FIG. 5 illustrates a methodology according to one exemplary embodiment of the disclosed systems and methods.

FIG. 5 illustrates one exemplary embodiment of a methodology 500 in which some of the multiple embodiments of the disclosed systems and methods may be implemented together to identify viewable areas of a display panel that are currently not utilized by a user, and then to selectively and dynamically turn off backlights or blocks of backlights (e.g., such as light emitting diode "LED" backlight elements) that illuminate viewable areas of the display panel that correspond to these non-utilized viewable areas.

As shown in FIG. 5, methodology 500 begins in block 502 and proceeds to block 504 where scalar 164 detects whether multiple image sources are coupled to scalar 164 and assigned to display respective images to different sections of a split display panel, e.g., in a PIP or PBP configuration. If so, then methodology 500 proceeds with blocks 506 and 508, e.g., in a manner as illustrated and described in relation to FIGS. 4A, 4B and 4C. Specifically, in block 506 scalar 164 detects whether any of the multiple image source's are currently inactive and providing no input signals to scalar 164 and identifies their corresponding display panel areas as non-utilized. If any inactive image source/s are detected in block 506, then coordinates of the identified non-utilized display panel area section/s corresponding to the inactive image source/s are obtained by scalar 164 in block 508. In any case, methodology 500 then proceeds from one of blocks 502, 504 or 506 to block 510 as shown in FIG. 5.

In block 510 of methodology 500, DM 204 determines whether a multiple display partition scheme is currently implemented. If so, then methodology 500 proceeds with blocks 512 and 514, e.g., in a manner as illustrated and described in relation to FIGS. 2A, 2B and 2C. Specifically, in block 512, DM 204 identifies whether any of the multiple partition zone/s of the current multiple image source/s are currently non-utilized. If any non-utilized partition zone/s are identified in block 512, then coordinates of the identified non-utilized partition zone/s corresponding to the inactive image source/s are obtained by DM 204 in block 514. In any case, methodology 500 then proceeds from one of blocks 510, 512 or 514 to block 516 as shown in FIG. 5.

In block 516 of methodology 500, DM 204 determines whether any current viewable screen area/s (e.g., application window 302 or desktop 304) of display panel 196 have been identified (e.g., designated) by a system user as being a non-utilized viewable display screen area, e.g., in a manner as illustrated and described in relation to FIGS. 3A, 3B and 3C. If any non-utilized screen area/s are identified by the system user in block 516, then coordinates of the user-identified non-utilized viewable display screen area/s are obtained by DM 204 in block 518. In any case, methodology 500 then proceeds from one of blocks 516 or 518 to block 520 as shown in FIG. 5.

Next, in block 520, any coordinates of non-utilized areas of display panel 196 that were generated in blocks 508, 514, and/or 518 are combined and mapped as corresponding to non-utilized area/s of display panel 196 by scalar 164 to backlights (or blocks of backlights) of backlight panel 194. Next, in block 522, all backlights (or blocks of backlights) mapped in block 520 as corresponding to non-utilized area/s of display panel 196 are turned off by scalar 164. Next, if the system user has selected to override the previous blocks in block 524 by entering a command to turn back on all backlights (or blocks of backlights), then methodology 500 proceeds to block 526, where scalar 164 causes all backlights (or blocks of backlights) to be turned on. In any case, methodology 500 iteratively repeats from block 524 or 526 to block 502 as shown in FIG. 5.

Still referring to FIG. 5, the user override command option of blocks 524 and 526 may be provided in one embodiment to avoid a poor user experience in the case backlights (or blocks of backlights) corresponding to a non-utilized viewable screen area of display panel 196 is for any reason being turned off in block 522 against the wish of the system user. In a further embodiment, backlights (or blocks of backlights) may be turned off in block 522 using a slow transition (e.g., occurring over a pre-defined designated time period of about 5 seconds or any greater or less pre-defined time period) from brightly turned "on" to dimly turned "on" to turned "off". Any time during this transition to turned "off", the system user may be given the opportunity to enter a command to override the backlight dimming and turning off, e.g., by some pre-defined action such as touching any on-screen-display (OSD) keys, activating a predefined mouse/key board event, moving the mouse to the affected non-utilized viewable area of display panel 196, etc. In one embodiment, a shortcut key may also be defined for this, e.g., as a frequently used action.

Figure 6:
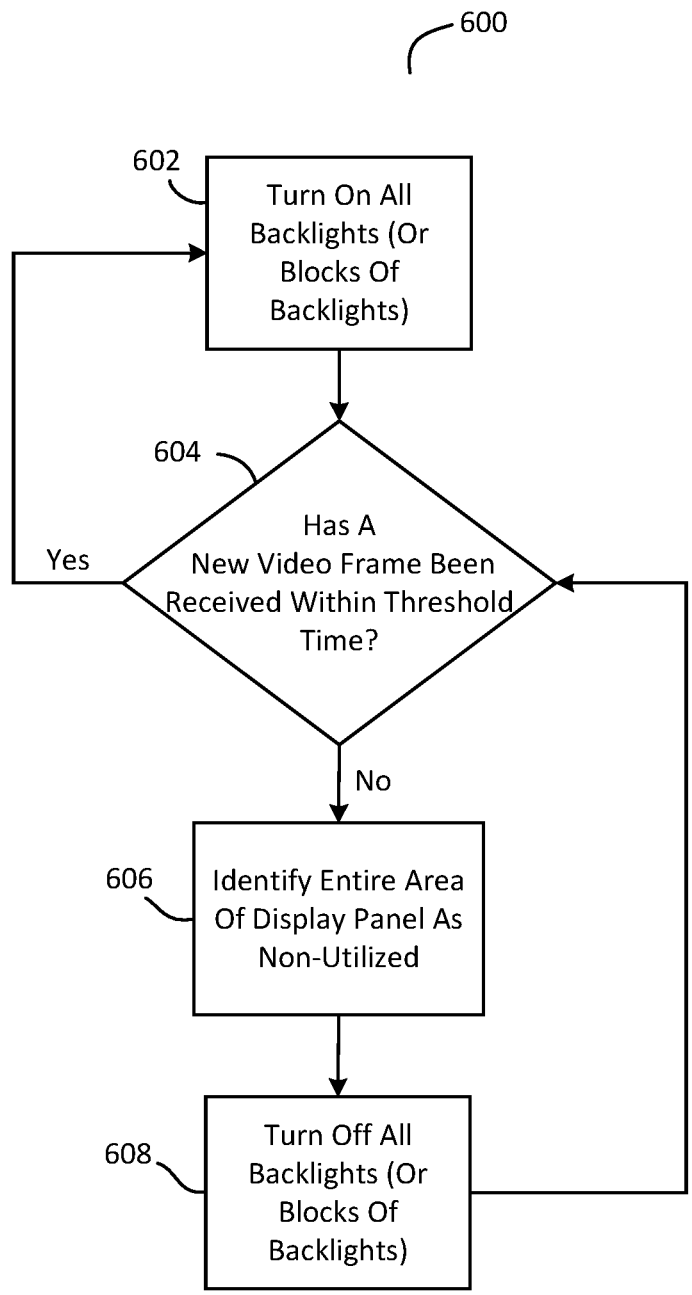
FIG. 6 illustrates a methodology according to one exemplary embodiment of the disclosed systems and methods.

FIG. 6 illustrates another exemplary embodiment of a methodology 600 that may be implemented by scalar 164 of a display panel assembly 125 that has built-in memory to buffer the frame data to identify non-utilized viewable area of a display panel 196, e.g., using the Panel Replay capability of the Video Electronics Standards Association (VESA) DisplayPort™ 2.0 Video Standard (DP 2.0). In the embodiment of FIG. 6, iGPU 109 or dGPU 120 stops providing new video frames in an image content data stream 117 to display panel assembly 125 when there is no change in image content from the previously-provided video frame (i.e., when the new video frame is the same as the previous video frame), so that the display panel assembly 125 will "replay" the same image on the viewable area of display panel 196. In such a case, iGPU 109 or dGPU 120 will only once again provide a new video frame to display panel assembly 125 in an image content data stream 117 to display panel assembly 125 when a change in image content occurs over the previously-provided video frame (i.e., when the new video frame is different from the previous video frame), so that the display panel assembly 125 will "replay" the same image on the viewable area of display panel 196. One example of a change in image content between different video frames is illustrated in previously-described FIGS. 4A and 4B, where the clouds in the webcam image of section 402 change with passage of time from a first time in FIG. 4A to a later time in FIG. 4B.

Methodology 600 starts in block 602 with all backlights (or all blocks of backlights) of display panel assembly 125 turned on to illuminate the entire viewable area of display panel 196 together with at least one currently displayed viewable image/s provided by content data stream 117. In block 604 of methodology 600, logic executing on scalar 164 may determine the elapsed time since receipt of the most recent new video frame having different image content from its immediately preceding previous video frame has been provided in image content data stream 117 to update the viewable image currently displayed on display panel 196, and to compare this determined elapsed time to a predefined threshold period of time to determine whether a new video frame has been received within the predefined threshold period of time (e.g., within 5 minutes or any other greater or lesser predefined time-out time period). If so, then methodology 600 repeats as shown, and scalar 164 keeps all backlights (or all blocks of backlights) of display panel assembly 125 turned "on", e.g., while the most recently received video image is replayed during the time that no new video frame that contains different image content is received. This would be the case where the elapsed time since receipt of the most recent new video frame determined in block 604 is less than or equal to the predefined threshold period of time.

However, if it is determined in block 604 that no new video frame having different image content that differs from its immediately preceding previous video frame has been provided within the predefined threshold period of time (e.g., within the previous 5 minutes), then methodology 600 proceeds to block 606 where logic on scalar 164 determines that the entire viewable area of display panel 196 is non-utilized, and then turns off all the backlights (or all blocks of backlights) of the display panel assembly 125 in block 608, e.g., to reduce power consumption. This would be the case where the elapsed time since receipt of the most recent new video frame determined in block 604 is greater than (or exceeds) the predefined threshold period of time.

As shown in FIG. 6, once a new video frame having different image content from its immediately preceding previous video frame has been again provided, then logic on scalar 164 determines in block 608 that the current viewable area of display 196 is again utilized, and logic on scalar 164 then again turns on all the backlights (or all blocks of backlights) of the display panel assembly 125. To implement this embodiment, backlight panel 194 may employ any type of backlight configuration that illuminates the entire viewable area of display panel 196, e.g., including local dimming configurations, or non-local dimming backlight configurations that only allow all backlights (or blocks of backlights) to be turned on or off at once.

Figure 7:
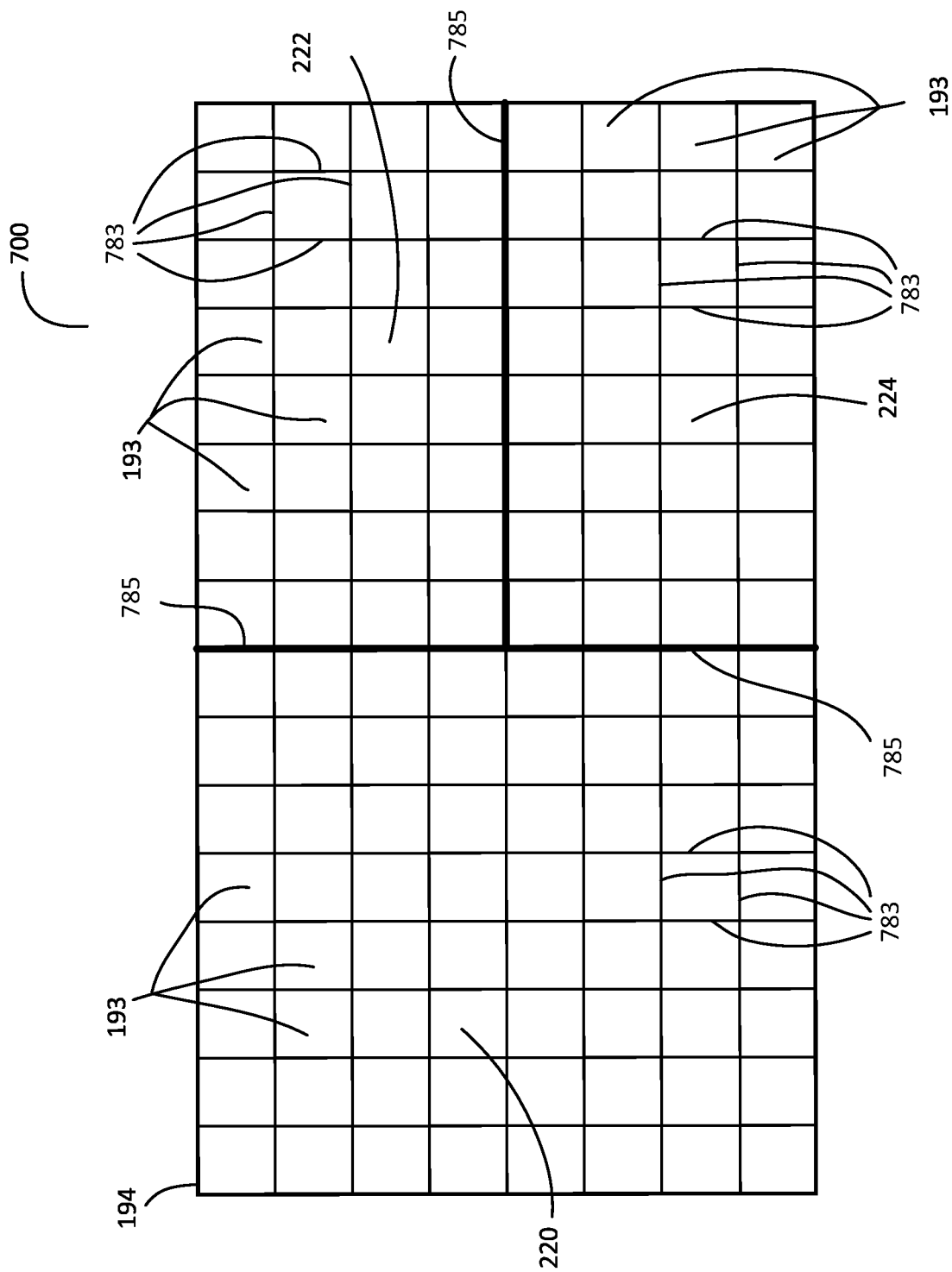
FIG. 7 illustrates a front view of a backlight panel with superimposed boundaries of a displayed partition scheme according to one exemplary embodiment of the disclosed systems and methods.

FIG. 7 illustrates a front view of one exemplary embodiment 700 of a LED backlight panel 194 of system 100 that is configured to implement direct backlighting for the disclosed systems and methods using a two-dimensional (2D) array of 128 separate backlight blocks 193 that are distributed across the entire backlight panel 194. In this embodiment, each backlight block 193 may include one or more separate individual LEDs, e.g., multiple separate individual LEDs provided in each backlight block 193 which are controlled together so that each individual LED of the same backlight block 193 is controlled in unison with other individual LEDs of the same backlight block 193. In this embodiment, local dimming logic 131 executing on scalar 164 may be programmed to perform full array local dimming backlight block control by separately adjusting the brightness (and "on" and "off" status) of each of the individual LED blocks 193 (e.g., in a local dimming operation) so that the brightness of the multiple LED blocks 193 may be controlled to be different from each other at any given time. Although FIG. 7 illustrates a LED backlight panel having a 2D array of 128 separately-controllable backlight blocks 193, it will be understood that the disclosed systems and methods maybe implemented with LED backlight panels having 2D arrays having lesser or greater numbers of separately-controllable backlight blocks 193 (e.g., such as a 2D array of 512 or more such backlight blocks 193).

Still referring to FIG. 7, the boundaries 785 of the individual partition zones 220, 222 and 224 of the selected viewable area partition scheme $214_Z$ displayed on display panel 196 of FIG. 2B are shown superimposed over the separate backlight blocks 193 of backlight panel 194 in the manner as may exist in one exemplary embodiment of display panel assembly 125. As shown, adjacent backlight blocks 193 are separated from each other by boundaries 783. This exemplary embodiment shows how, with knowledge of the arrangement of backlight blocks 193 of backlight panel 194, DM 204 may be programmed to tailor (e.g., optimize) the location (e.g., coordinates) of the boundaries or edges 785 of the individual partition zones (e.g., zones 220, 222 and 224 in this case) on display panel 196 so that these boundaries 785 on display panel 196 align (or line up) with selected existing boundaries 783 between the LED blocks 193 of backlight panel 194 (i.e., as opposed to extending across the body of LED blocks 193 between the boundaries 783 of blocks 193). This may be done, for example, in order to maximize the number of LED blocks 193 corresponding to currently non-utilized partition zone areas (see, for example, the embodiments of FIGS. 2A, 2B, 2C) that may be turned off at any given time, while at the same time minimizing "bleeding" of light into the darkened area/s corresponding to the non-utilized partition zone/s having turned off backlight blocks.

Besides using full array dimming control of a backlight panel 194 configured with an array of direct backlighting backlight blocks 193 (such as the embodiment of FIG. 7), It will be understood that the disclosed systems and method may be implemented with a display panel assembly 125 having any other type of backlight panel 194 configuration with individual backlights (or blocks of backlights) that may be selectively and individually turned off to darken only selected parts of the viewable area of a corresponding display panel 196, while illuminating the remainder of the viewable area of the same display panel 196.

Figure 8:
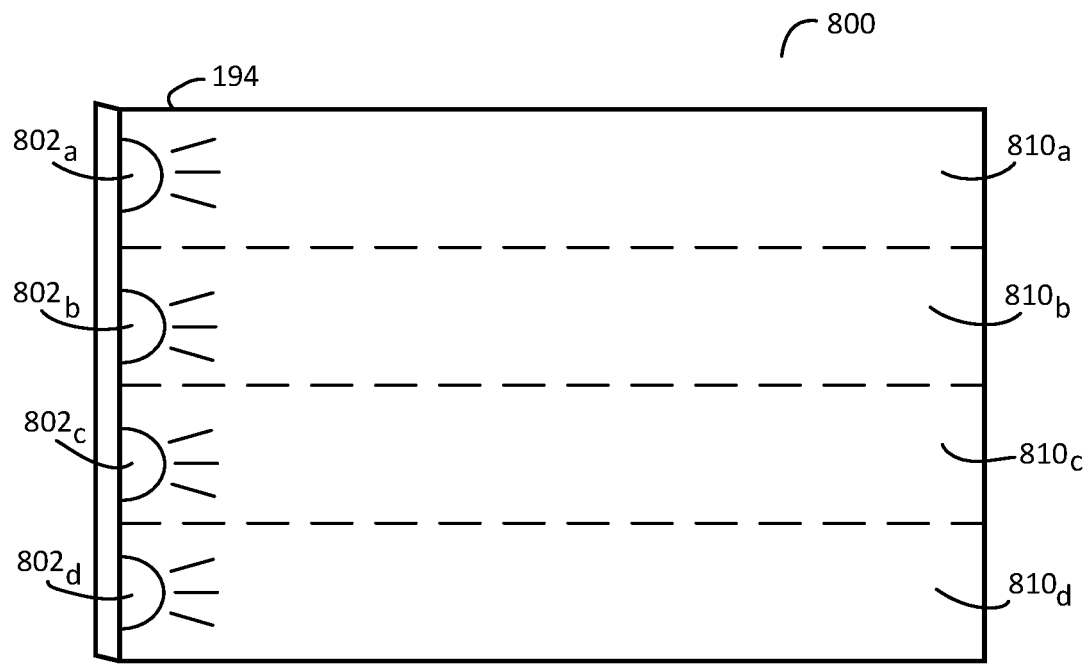
FIG. 8 illustrates a front view of a backlight panel according to one exemplary embodiment of the disclosed systems and methods.

As just one possible example of such a suitable backlight panel configuration, FIG. 8 illustrates one example of such a suitable backlight panel embodiment 800 having a backlight panel 194 that implements local dimming with a one dimensional (1D) edge-lit backlight configuration in which individual backlight blocks 802 (e.g., each containing one or more LED backlights) are positioned along one side edge of the backlight panel 194 as shown. In one embodiment, such a backlight panel 800 may be optionally configured with multiple LED bars that are positioned along the side edge of backlight panel 194 and further divided into the individually and independently-adjustable blocks 802. The individual backlight blocks 802 of backlight panel embodiment 800 may be separately controlled (e.g., turned on and turned off) to selectively backlight separate elongated rectangular areas of a mated display panel 196 with the controllable backlight areas 810a, 810b, 810c and 810d produced by the respective backlight blocks 802a, 802b, 802c and 802d. The number of controllable backlight blocks 802 and their corresponding backlight areas 810 shown in FIG. 8 is exemplary only, and may be greater or lesser in number in other embodiments.

Figure 9:
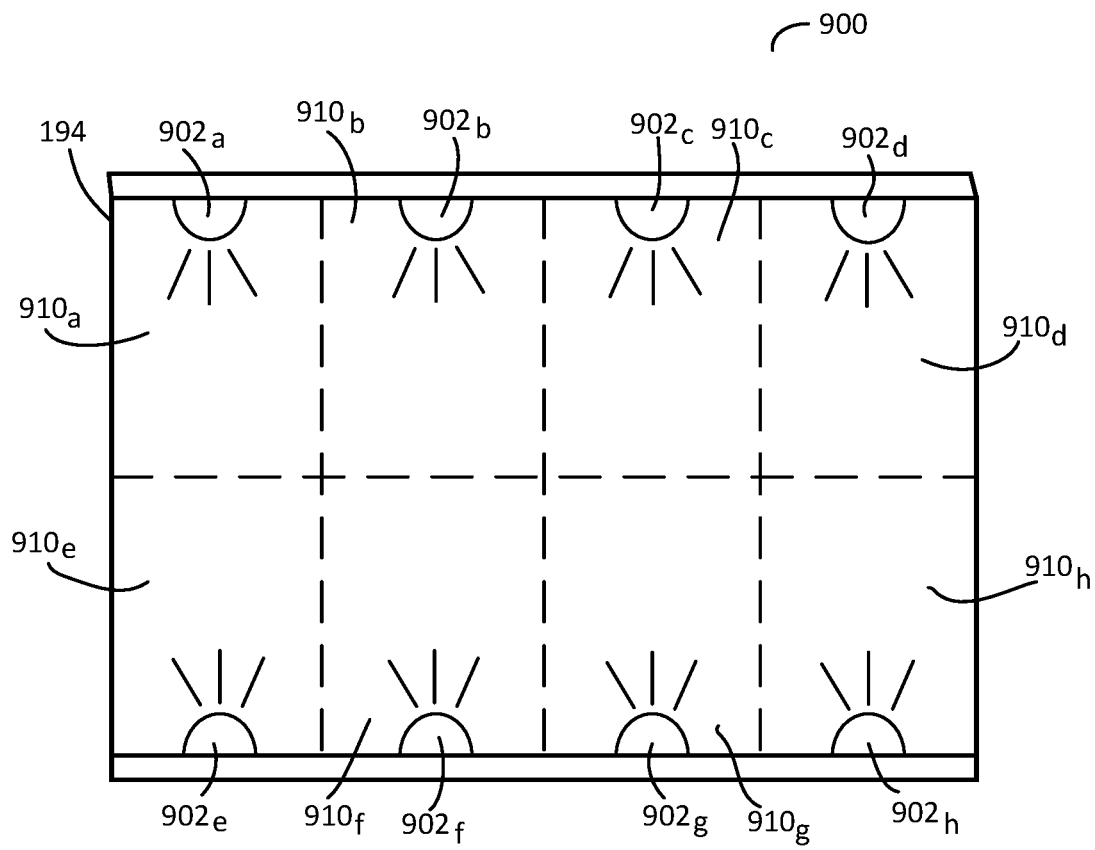
FIG. 9 illustrates a front view of a backlight panel according to one exemplary embodiment of the disclosed systems and methods.

As just one other possible example of such a suitable backlight panel configuration, FIG. 9 illustrates one example of such a suitable backlight panel embodiment 900 having a backlight panel 194 that implements local dimming with a one and a half dimensional (1.5D) edge-lit backlight configuration in which individual backlight blocks 902 (e.g., each containing one or more LED backlights) are positioned along each of top and bottom edges of the backlight panel 194 as shown. In one embodiment, such a backlight panel 900 may be optionally configured with multiple LED bars that are positioned along each of the top and bottom edges of backlight panel 194 and that are further divided into the individually and independently-adjustable blocks 902. The individual backlight blocks 902 of backlight panel embodiment 900 may be separately controlled (e.g., turned on and turned off) to selectively backlight separate rectangular areas of a mated display panel 196 with the backlight areas 910a to 910h produced by the respective controllable backlight blocks 902 to 902h. Once again, the number of controllable backlight blocks 902 and their corresponding backlight areas 910 shown in FIG. 9 is exemplary only, and may be greater or lesser in number in other embodiments.

It will understood that the particular combination of actions of the methodologies of each of FIGS. 2C, 3D, 4C, 5 and 6 are exemplary only, and that other combinations of these or other actions may be employed that are suitable for performing the function of the particular methodology. For example, in one exemplary embodiment, the disclosed systems and methods may also be implemented in similar manner with organic light emitting diode (OLED) display panel assemblies that have an OLED display panel that includes OLEDs or blocks of OLEDs, in which case individual OLEDs or blocks of OLEDs of the OLED display panel that correspond to identified non-utilized viewable areas of the OLED display panel may be selectively turned off so as to turn off display of illuminated image content from the identified currently non-utilized viewable areas of the OLED display panel.

It will also be understood that one or more of the tasks, functions, or methodologies described herein (e.g., including those described herein for components 103, 105, 106, 107, 109, 110, 111, 115, 120, 121, 123, 127, 129, 131, 132, 135, 159, 164, 165, 173, 185, 186, 204, 205, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
    providing image content data to a display panel assembly that comprises a display panel, and displaying illuminated image content from the image content data on the display panel; and
    executing programming on at least one programmable integrated circuit to:
        identify one or more viewable areas of the display panel as currently non-utilized; and selectively turn off display of illuminated image content from the identified currently non-utilized viewable areas of the display panel;

where the identified currently non-utilized viewable areas of the display panel represent only a portion of an entire viewable area of the display panel;

where the method further comprises executing programming on the at least one programmable integrated circuit to:

display at least one of an application context window or a desktop context window on the display panel to a user of the display panel, the currently displayed application context window or desktop context window comprising user-selectable control options for at least one of a currently displayed application window or a currently displayed desktop area; and where the executing programming on the at least one programmable integrated circuit to identify one or more viewable areas of the display panel as currently non-utilized further comprises executing programming on the at least one programmable integrated circuit to:

receive input from the user that selects one of the user-selectable control options that only one of: designates the at least one currently displayed application window or desktop area, or designates all viewable areas of the display panel except for the at least one currently displayed application window or desktop area, and respond to the received user designation by identifying the designated one or more viewable areas of the display panel as currently non-utilized.

2. A method, comprising:

providing image content data to a display panel assembly that comprises a display panel, and displaying illuminated image content from the image content data on the display panel; and executing programming on at least one programmable integrated circuit to:

identify one or more viewable areas of the display panel as currently non-utilized, and selectively turn off display of illuminated image content from the identified currently non-utilized viewable areas of the display panel;

where the display panel assembly further comprises a backlight panel that comprises multiple backlights or multiple blocks of backlights that illuminate the display panel; where the identified currently non-utilized viewable areas of the display panel represent only a portion of an entire viewable area of the display panel; and where the method further comprises executing programming on the at least one programmable integrated circuit to:

selectively turn off one or more backlights or one or more blocks of backlights that illuminate the identified currently non-utilized viewable areas of the display panel so that the identified currently non-utilized viewable areas of the display panel are not illuminated, and at the same time selectively turn on or leave on one or more other backlights or one or more other blocks of backlights to illuminate viewable areas of the display panel that are not identified as currently non-utilized viewable areas of the display panel.

3. The method of claim 2, where the executing programming on the at least one programmable integrated circuit to identify one or more viewable areas of the display panel as currently non-utilized further comprises executing programming on the at least one programmable integrated circuit to:

receive input from a user of the display panel that designates the one or more viewable areas of the display panel; and respond to the received user designation by identifying the designated one or more viewable areas of the display panel as currently non-utilized.

4. The method of claim 3, further comprising executing programming on the at least one programmable integrated circuit to:

display at least one of an application context window or a desktop context window on the display panel to the user of the display panel, the currently displayed application context window or desktop context window comprising user-selectable backlight control options for at least one of a currently displayed application window or a currently displayed desktop area; and where the executing programming on the at least one programmable integrated circuit to identify one or more viewable areas of the display panel as currently non-utilized further comprises receiving the input from the user that selects one of the user-selectable backlight control options that only one of:

designates the at least one currently displayed application window or desktop area, or designates all viewable areas of the display panel except for the at least one currently displayed application window or desktop area.

5. The method of claim 2, where the executing programming on the at least one programmable integrated circuit to identify one or more viewable areas of the display panel as currently non-utilized further comprises executing programming on the at least one programmable integrated circuit to:

display multiple partition zones on respective viewable areas of the display panel, and turn on or leave on the one or more backlights or one or more blocks of backlights to illuminate the displayed multiple partition zones;

then identify any one or more of the displayed partition zones that do not currently contain an assigned application window as one of the non-utilized viewable areas; and then selectively turn off the one or more backlights or the one or more blocks of backlights so that the identified currently non-utilized viewable areas of the display panel are not illuminated while at the same time selectively leaving on the one or more other backlights or the one or more other blocks of backlights to illuminate the viewable areas of the display panel that are not identified as currently non-utilized viewable areas of the display panel.

6. The method of claim 5, further comprising executing programming on the at least one programmable integrated circuit to then respond to an input from the user by selectively turning on the one or more backlights or the one or more blocks of backlights that were previously turned off so that the identified currently non-utilized viewable areas of the display panel are now illuminated.

7. A method, comprising:

providing image content data to a display panel assembly that comprises a display panel, and displaying illuminated image content from the image content data on the display panel; and executing programming on at least one programmable integrated circuit to:
  identify one or more viewable areas of the display panel as currently non-utilized, and
  selectively turn off display of illuminated image content from the identified currently non-utilized viewable areas of the display panel;
where the providing image content data to the display panel assembly comprises:
  providing first image content data from a first image source in a first input signal to the display panel and displaying an illuminated first image from the first image content data on a first section of the display panel, while at the same time providing second image content data from a second and different image source in a second input signal to the display panel, and displaying an illuminated second image from the second image content data on a second and different section of the display panel;
where the executing programming on the at least one programmable integrated circuit to identify one or more viewable areas of the display panel as currently non-utilized further comprises executing programming on the at least one programmable integrated circuit to:
  monitor a status of each of the first input signal and the second input signal, and
  respond to a detected absence of the first input signal by identifying the first section of the display panel as a viewable area of the display panel that is currently non-utilized, and respond to a detected absence of the second input signal by identifying the second section of the display panel as a viewable area of the display panel that is currently non-utilized,
  respond to a detected presence of the first input signal by identifying the first section of the display panel as a viewable area of the display panel that is currently utilized, and respond to a detected presence of the second input signal by identifying the second section of the display panel as a viewable area of the display panel that is currently utilized; and
where the method further comprises executing programming on the at least one programmable integrated circuit to selectively turn off display of illuminated image content on any identified currently non-utilized viewable area of the display panel corresponding to either the first section or the second section of the display panel, while at the same time selectively turning on or leaving on display of illuminated image content on any identified currently utilized viewable area of the display panel corresponding to either the first section or second section of the display panel.

8. A method, comprising:
providing image content data to a display panel assembly that comprises a display panel, and displaying illuminated image content from the image content data on the display panel; and
executing programming on at least one programmable integrated circuit to:
  identify one or more viewable areas of the display panel as currently non-utilized, and
  selectively turn off display of illuminated image content from the identified currently non-utilized viewable areas of the display panel;
where the providing image content data to the display panel assembly comprises:
  providing multiple sequential video frames in the image content data to the display panel, and displaying illuminated sequential images corresponding to each of the provided multiple sequential video frames on a first viewable area of the display panel;
where the executing programming on the at least one programmable integrated circuit to identify one or more viewable areas of the display panel as currently non-utilized further comprises executing programming on the at least one programmable integrated circuit to:
  monitor a time of receipt of each new video frame in the image content data provided to the display panel and determine a current elapsed time since receipt of the most recent previous new video frame in the image content data provided to the display panel,
  compare the determined elapsed time since receipt of the most recent previous new video frame in the image content data to a predefined threshold period of time, and
  identify the first viewable area of the display panel as currently non-utilized only if the determined elapsed time since receipt of the most recent previous new video frame exceeds the predefined threshold period of time; and
where the method further comprises executing programming on the at least one programmable integrated circuit to:
  then selectively turn off the display of the illuminated sequential images corresponding to each of the provided multiple sequential video frames on the first viewable area of the display panel only if the first viewable area of the display panel is identified as currently non-utilized, and
  then respond to receipt of the next new video frame in the image content data by selectively turning on or leaving on the display of the illuminated sequential images corresponding to each of the provided multiple sequential video frames on the identified currently non-utilized first viewable area of the display panel.

9. A method, comprising:
providing image content data to a display panel assembly that comprises a display panel, and displaying illuminated image content from the image content data on the display panel; and
executing programming on at least one programmable integrated circuit to:
  identify one or more viewable areas of the display panel as currently non-utilized, and
  selectively turn off display of illuminated image content from the identified currently non-utilized viewable areas of the display panel;
where the executing programming on the at least one programmable integrated circuit to identify one or more viewable areas of the display panel as currently non-utilized further comprises executing programming on the at least one programmable integrated circuit to:
  combine the following identified currently non-utilized viewable areas of the display panel to determine a combined identified non-utilized viewable area of the display panel: any currently non-utilized viewable areas of the display panel designated by a user of the display panel, any currently non-utilized viewable areas of the display panel identified as displayed partition zones that do not currently contain any assigned application window, and any currently non-utilized viewable areas of the display panel identified as corresponding to sections of the display panel that are designated to display images received in image content data of an input signal that is currently not being provided by its corresponding image source; and where the executing programming on the at least one programmable integrated circuit to selectively turn off display of illuminated image content from the identified currently non-utilized viewable areas of the display panel further comprises selectively turning off display of illuminated image content on the combined identified non-utilized viewable area of the display panel.

10. The method of claim 1, further comprising then executing programming on the at least one programmable integrated circuit to respond to a command received from a user of the display panel by turning on the display of illuminated image content from the identified currently non-utilized viewable areas of the display panel.

11. A method, comprising:
providing image content data to a display panel assembly that comprises a display panel, and displaying illuminated image content from the image content data on the display panel; and
executing programming on at least one programmable integrated circuit to:
identify one or more viewable areas of the display panel as currently non-utilized, and
selectively turn off display of illuminated image content from the identified currently non-utilized viewable areas of the display panel;
where the identified currently non-utilized viewable areas of the display panel represent only a portion of an entire viewable area of the display panel; and
where the executing programming on the at least one programmable integrated circuit to identify one or more viewable areas of the display panel as currently non-utilized further comprises executing programming on the at least one programmable integrated circuit to:
display multiple predefined partition zones on respective viewable areas of the display panel, and illuminate the displayed multiple predefined partition zones,
then respond to a user input by moving one or more different displayed application windows into at least one of the existing displayed predefined partition zones to assign the displayed application windows to the at least one of the existing displayed predefined partition zones;
then identify any one or more of the existing displayed predefined partition zones that do not currently contain an assigned displayed application window as one of the non-utilized viewable areas, and
then selectively turn off illumination of the identified currently non-utilized viewable areas of the display panel while at the same time selectively illuminating the viewable areas of the display panel that are not identified as currently non-utilized viewable areas of the display panel.

12. A system, comprising:
a display panel assembly comprising a display panel, the display panel assembly displaying illuminated image content from the image content data on the display panel; and
at least one programmable integrated circuit programmed to:
identify one or more viewable areas of the display panel as currently non-utilized, and
selectively turn off display of illuminated image content from the identified currently non-utilized viewable areas of the display panel;
where the display panel assembly further comprises a backlight panel that comprises multiple backlights or multiple blocks of backlights that illuminate the display panel; where the identified currently non-utilized viewable areas of the display panel represent only a portion of an entire viewable area of the display panel; and where the at least one programmable integrated circuit is programmed to:
selectively turn off one or more backlights or one or more blocks of backlights so that the identified currently non-utilized viewable areas of the display panel are not illuminated, and
at the same time selectively turn on or leave on one or more other backlights or one or more other blocks of backlights to illuminate viewable areas of the display panel that are not identified as currently non-utilized viewable areas of the display panel.

13. The system of claim 12, where the at least one programmable integrated circuit is programmed to:
receive input from a user of the display panel that designates the one or more viewable areas of the display panel; and
respond to the received user designation by identifying the designated one or more viewable areas of the display panel as currently non-utilized.

14. The system of claim 13, where the at least one programmable integrated circuit is programmed to:
display at least one of an application context window or a desktop context window on the display panel to the user of the display panel, the currently displayed application context window or desktop context window comprising user-selectable backlight control options for at least one of a currently displayed application window or a currently displayed desktop area; and
receive the input from the user that selects one of the user-selectable backlight control options that only one of:
designates the at least one currently displayed application window or desktop area, or
designates all viewable areas of the display panel except for the at least one currently displayed application window or desktop area.

15. The system of claim 12, where the at least one programmable integrated circuit is programmed to:
display multiple partition zones on respective viewable areas of the display panel, and turn on or leave on the one or more backlights or one or more blocks of backlights to illuminate the displayed multiple partition zones;
then identify any one or more of the displayed partition zones that do not currently contain an assigned application window as one of the non-utilized viewable areas; and
then selectively turn off the one or more backlights or the one or more blocks of backlights so that the identified currently non-utilized viewable areas of the display panel are not illuminated while at the same time selectively leaving on the one or more other backlights or the one or more other blocks of backlights to illuminate the viewable areas of the display panel that are not identified as currently non-utilized viewable areas of the display panel.

16. The system of claim 15, where the at least one programmable integrated circuit is programmed to then respond to an input from the user by selectively turning on the one or more backlights or the one or more blocks of backlights that were previously turned off so that the identified currently non-utilized viewable areas of the display panel are now illuminated.

17. A system, comprising:
a display panel assembly comprising a display panel, the display panel assembly displaying illuminated image content from the image content data on the display panel; and
at least one programmable integrated circuit programmed to:
identify one or more viewable areas of the display panel as currently non-utilized, and
selectively turn off display of illuminated image content from the identified currently non-utilized viewable areas of the display panel;
where the display panel assembly displays:
an illuminated first image on a first section of the display panel, the first image from first image content data received in a first input signal received from a first image source, and
an illuminated second image on a second and different section of the display panel, the second image from second image content data received in a second input signal received from a second and different image source; and
where the at least one programmable integrated circuit is programmed to:
monitor a status of each of the first input signal and the second input signal, and
respond to a detected absence of the first input signal by identifying the first section of the display panel as a viewable area of the display panel that is currently non-utilized, and respond to a detected absence of the second input signal by identifying the second section of the display panel as a viewable area of the display panel that is currently non-utilized,
respond to a detected presence of the first input signal by identifying the first section of the display panel as a viewable area of the display panel that is currently utilized, and respond to a detected presence of the second input signal by identifying the second section of the display panel as a viewable area of the display panel that is currently utilized; and
where the at least one programmable integrated circuit is programmed to selectively turn off display of illuminated image content on any identified currently non-utilized viewable area of the display panel corresponding to either the first section or the second section of the display panel, while at the same time selectively turning on or leaving on display of illuminated image content on any identified currently utilized viewable area of the display panel corresponding to either the first section or second section of the display panel.

18. A system, comprising:
a display panel assembly comprising a display panel, the display panel assembly displaying illuminated image content from the image content data on the display panel; and
at least one programmable integrated circuit programmed to:
identify one or more viewable areas of the display panel as currently non-utilized, and
selectively turn off display of illuminated image content from the identified currently non-utilized viewable areas of the display panel;
where the image content data to the display panel comprises multiple sequential video frames, and where the display panel illuminated sequential images corresponding to each of the provided multiple sequential video frames on a first viewable area of the display panel; and where the at least one programmable integrated circuit is programmed to:
monitor a time of receipt of each new video frame in the image content data provided to the display panel and determine a current elapsed time since receipt of the most recent previous new video frame in the image content data provided to the display panel,
compare the determined elapsed time since receipt of the most recent previous new video frame in the image content data to a predefined threshold period of time, and
identify the first viewable area of the display panel as currently non-utilized only if the determined elapsed time since receipt of the most recent previous new video frame exceeds the predefined threshold period of time, then selectively turn off the display of the illuminated sequential images corresponding to each of the provided multiple sequential video frames on the first viewable area of the display panel only if the first viewable area of the display panel is identified as currently non-utilized, and then respond to receipt of the next new video frame in the image content data by selectively turning on or leaving on the display of the illuminated sequential images corresponding to each of the provided multiple sequential video frames on the identified currently non-utilized first viewable area of the display panel.

19. A system, comprising:
a display panel assembly comprising a display panel, the display panel assembly displaying illuminated image content from the image content data on the display panel; and
at least one programmable integrated circuit programmed to:
identify one or more viewable areas of the display panel as currently non-utilized, and
selectively turn off display of illuminated image content from the identified currently non-utilized viewable areas of the display panel;
where the at least one programmable integrated circuit is programmed to:
combine the following identified currently non-utilized viewable areas of the display panel to determine a combined identified non-utilized viewable area of the display panel: any currently non-utilized viewable areas of the display panel designated by a user of the display panel, any currently non-utilized viewable areas of the display panel identified as displayed partition zones that do not currently contain any assigned application window, and any currently non-utilized viewable areas of the display panel identified as corresponding to sections of the display panel that are designated to display images received in image content data of an input signal that is currently not being provided by its corresponding image source, and
selectively turn off display of illuminated image content on the combined identified non-utilized viewable area of the display panel.

20. A system, comprising:
- a display panel assembly comprising a display panel, the display panel assembly displaying illuminated image content from the image content data on the display panel; and
- at least one programmable integrated circuit programmed to:
  - identify one or more viewable areas of the display panel as currently non-utilized, and
  - selectively turn off display of illuminated image content from the identified currently non-utilized viewable areas of the display panel;
- where the at least one programmable integrated circuit comprises at least a first programmable integrated circuit and a second programmable integrated circuit, the first programmable integrated circuit being coupled to the display panel assembly and providing the image content data to the display panel assembly, and the second programmable integrated circuit being integrated within the display panel and receiving the image content data from the first programmable integrated circuit and providing output signals to cause display of the illuminated image content on the display panel and to selectively turn off the display of the illuminated image content on the display panel.

* * * * *